United States Patent
Kaizuka et al.

(10) Patent No.: US 6,396,507 B1
(45) Date of Patent: *May 28, 2002

(54) DATA STORAGE/ACCESS NETWORK SYSTEM FOR ZOOMING IMAGE AND METHOD OF THE STORAGE/ACCESS

(75) Inventors: Hiroshi Kaizuka; Katsuhiro Aoyagi, both of Tokyo (JP)

(73) Assignee: Nippon Steel Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/928,642

(22) Filed: Sep. 12, 1997

(30) Foreign Application Priority Data

| Sep. 13, 1996 | (JP) | 8-265583 |
| Oct. 29, 1996 | (JP) | 8-303729 |
| Nov. 1, 1996 | (JP) | 8-307213 |
| Nov. 1, 1996 | (JP) | 8-307214 |

(51) Int. Cl.[7] .................................................. G06T 3/40
(52) U.S. Cl. ........................ 345/661; 345/660; 382/299
(58) Field of Search ................................. 345/439, 127, 345/131, 132, 202, 511, 526, 537, 555, 660, 661; 382/299

(56) References Cited

U.S. PATENT DOCUMENTS

| 5,058,185 A | * | 10/1991 | Morris et al. ................. 382/41 |
| 5,159,647 A | * | 10/1992 | Burt ............................. 382/37 |
| 5,608,862 A | * | 3/1997 | Enokida ...................... 395/501 |
| 5,680,558 A | * | 10/1997 | Hatanaka et al. ........... 395/334 |
| 5,815,148 A | * | 9/1998 | Tanaka ........................ 345/335 |
| 5,852,439 A | * | 12/1998 | Musgrove et al. .......... 345/339 |
| 5,852,810 A | * | 12/1998 | Sotiroff et al. ................ 705/27 |
| 5,872,643 A | * | 2/1999 | Maeda et al. ............... 358/518 |

OTHER PUBLICATIONS

"Space–Scale Diagrams: Understanding Multiscale Interfaces":George Furnas & Benjamin Bederson: CHI '95 Proceedings Papers, Apr. 1995.*

* cited by examiner

*Primary Examiner*—Mark Zimmerman
*Assistant Examiner*—Mano Padmanabhan
(74) *Attorney, Agent, or Firm*—Connolly Bove Lodge & Hutz LLP

(57) ABSTRACT

In a data storage/access network system for zooming image, a data extraction unit for extracting a portion of image data in accordance with a request from a client machine is arranged in a server machine. When a request for enlarging a partial region is issued from the client side, only image data in the requested partial region is dynamically extracted on the server and transferred instead of transferring the entire file including the corresponding image data. With this arrangement, the amount of data to be transferred from the server to the client can be decreased.

43 Claims, 19 Drawing Sheets

REGION DESIGNATION TO ENLARGE

BEGINNING OF ZOOM-IN

COMPLETION OF ZOOM-IN

SWITCH TO AN IMAGE WITH A COLLECT RESOLUTION FROM SERVER MACHINE VIA ANOTHER THREAD

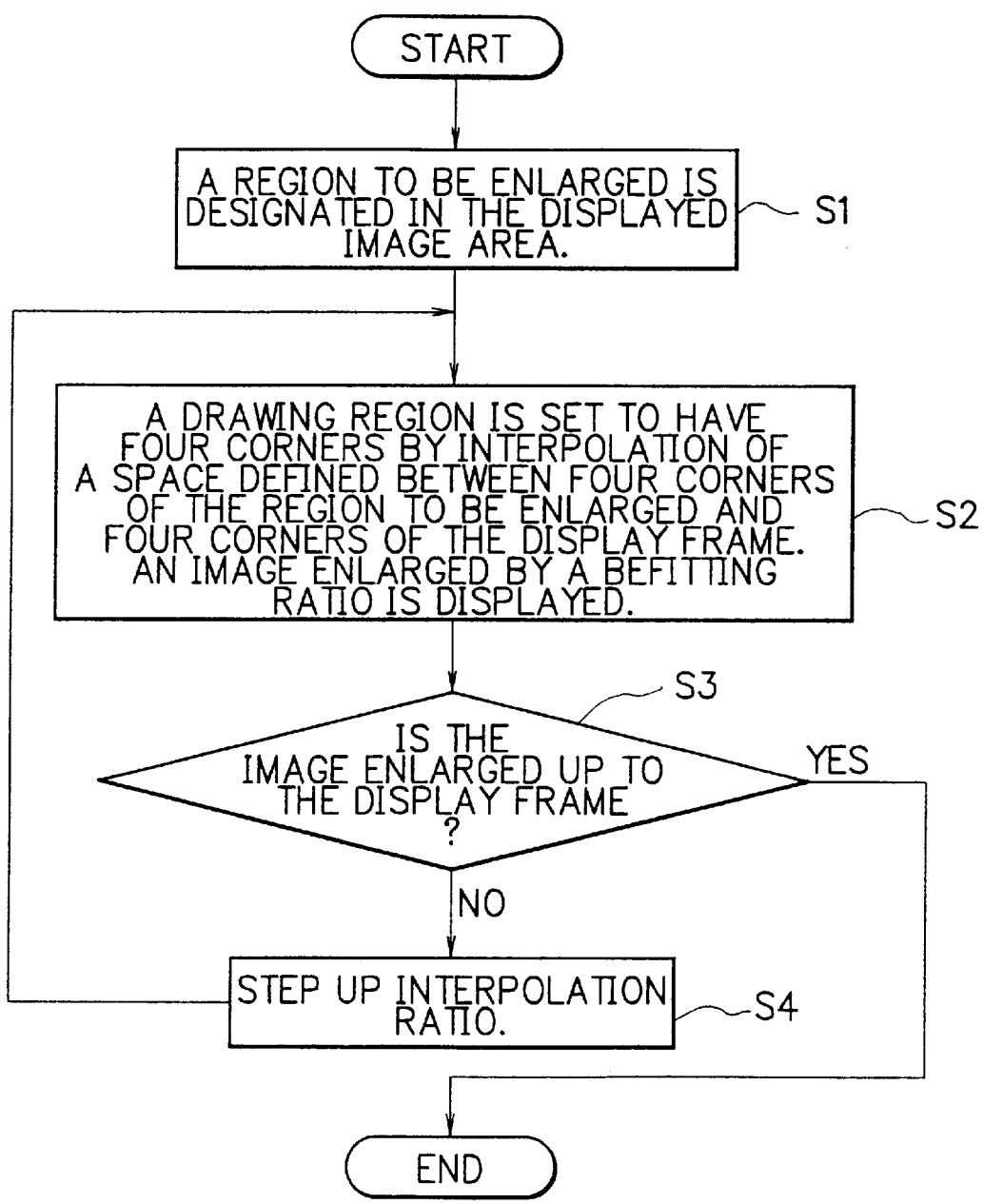

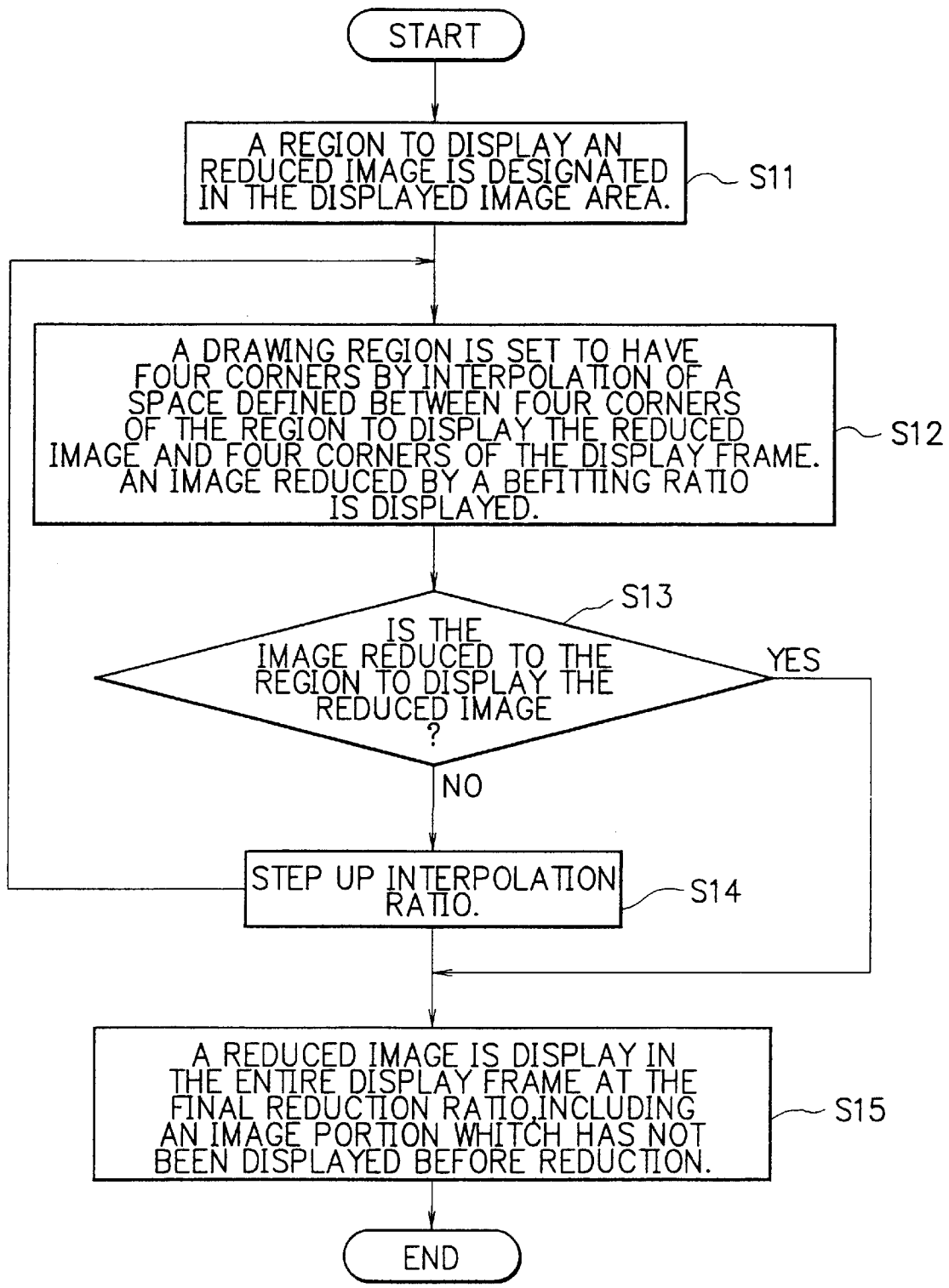

AN IMAGE BEFORE ZOOM-IN

BEGINNING OF ZOOM-IN

COMPLETION OF ZOOM-IN

ORIGINAL IMAGE

UPPER LEVEL
↕
LOWER LEVEL

UPPER LEVEL
↕
LOWER LEVEL

UPPER LEVEL
↕
LOWER LEVEL

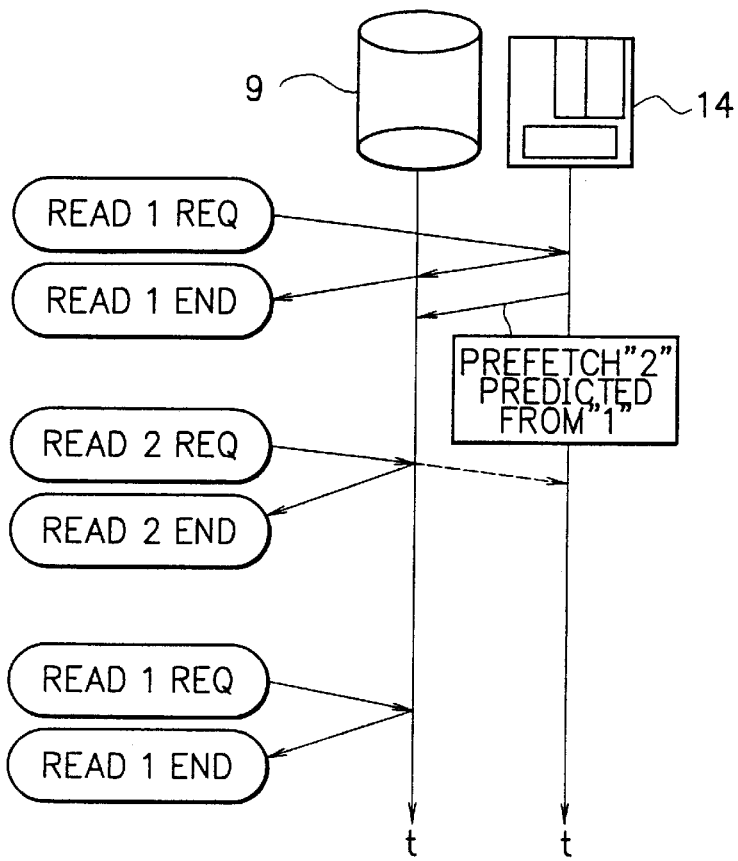

F I G. 16
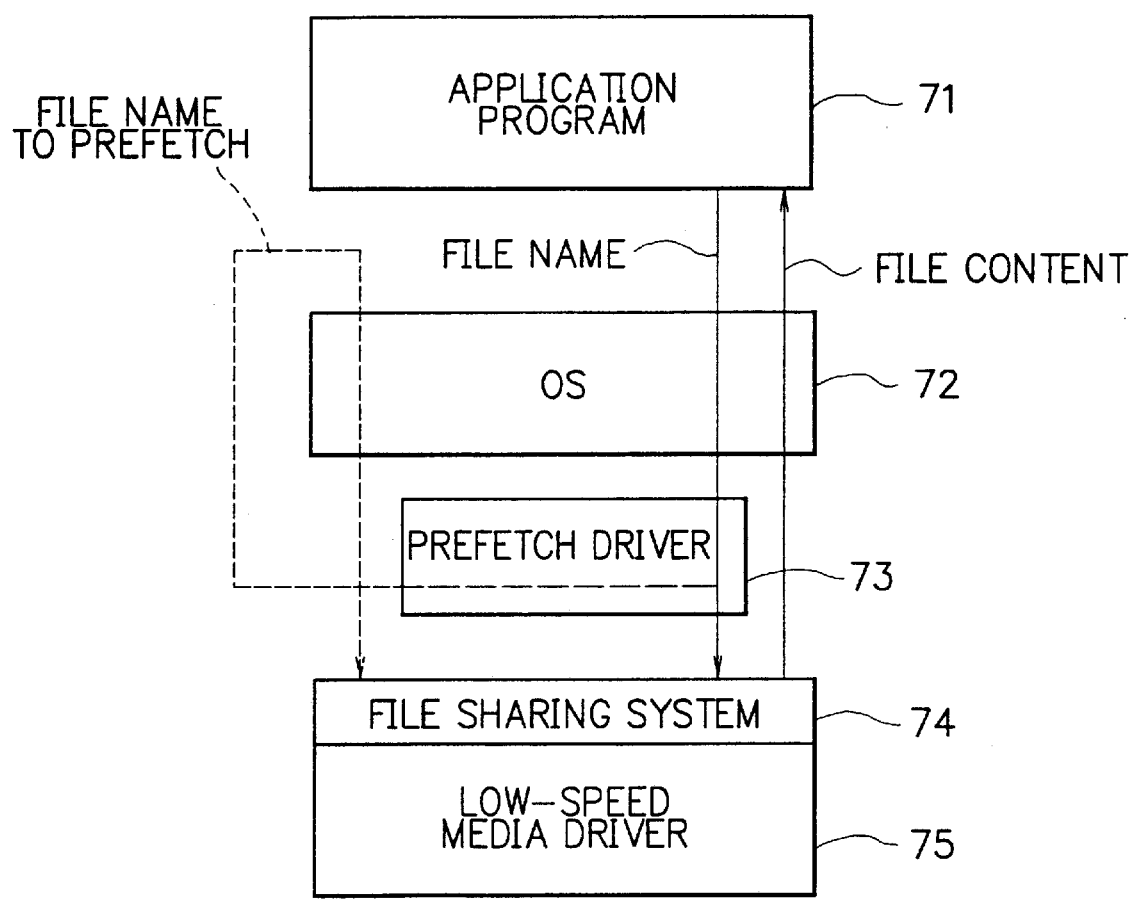

F I G. 17
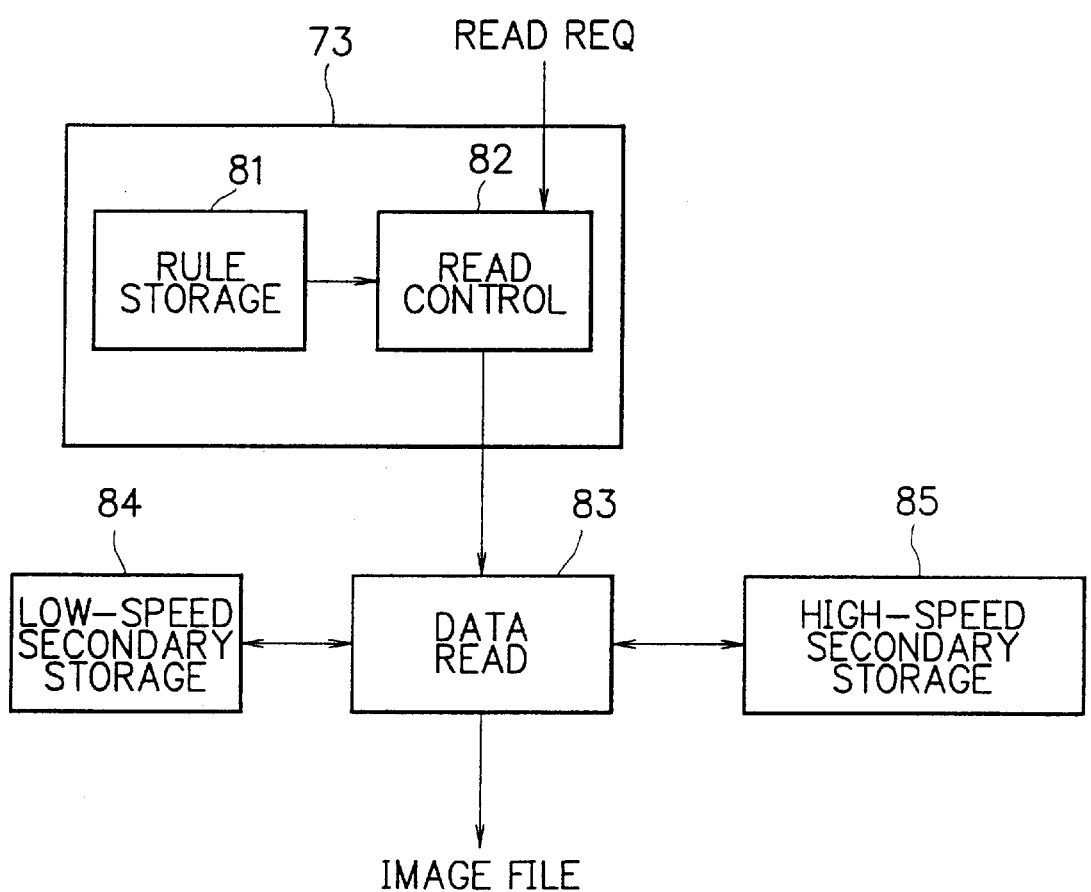

NORMAL READ CACHING

DATA STORAGE/ACCESS NETWORK SYSTEM FOR ZOOMING IMAGE AND METHOD OF THE STORAGE/ACCESS

BACKGROUND OF THE INVENTION

1. Field of the Invention

The present invention relates generally to a data storage/access network system for zooming image, more specifically to a data reading method and apparatus, a network system, an image zooming method and apparatus, an image data storage method and apparatus, an image data writing/reading system, and a recording medium.

2. Background of the Invention

Conventionally, many apparatuses each capable of storing digital image data in a memory or the like, reading out the image data, and displaying the image data are used.

Image data to be stored is input using an image input device such as an image scanner or a video camera using, e.g., a CCD. Most apparatuses can store a plurality of image data.

Individual image data are basically stored as image files. To store an image file having a large quantity of data, a large-capacity magnetooptical disk (MO) or hard disk (HDD) is used as a file storage unit. When an MO is used, one image data file is normally recorded on one MO. However, when the amount of image data constituting one image file exceeds the capacity of one MO, the image data is divided and stored in a plurality of MOs.

When the size of each image file is very large, as described above, or when a lot of image files are to be stored, a client/server system is implemented with a plurality of devices to store/read/display the image files via a network. More specifically, a plurality of image files are stored in a server. An image file designated from a client is read out and displayed on the display screen of the client.

When a large-scale image file unit is to be constituted using MOs on the server side, a disk library unit such as a jukebox capable of exchanging the plurality of MOs by an auto-change mechanism is used. In this disk library unit, disks are exchanged in accordance with an instruction from the client, so that a required image file is read out.

In the system of this type, since the size of each image file stored in the server is very large, the entire image data cannot be displayed in one screen because of the limited size of the display screen on the client side. Conventionally, image data stored in the server is reduced to a size which can be displayed in one screen, and displayed. For this reason, on the display screen of the client, the image cannot be displayed at the original precision.

When a detail of a photographic image is to be checked, or a specific component portion of a drawing is to be referred to in detail, the reduced entire image cannot cope with such a request. Therefore, part of the image must be enlarged to the full size of the screen and displayed at the original precision. According to this technique, when the entire image is to be observed, the image can be reduced and displayed, and when a detail is to be observed, the corresponding portion can be enlarged and displayed.

However, as described above, one image data is stored as one or a plurality of image files, and the image data is read out in units of files. For this reason, when a portion of the image is to be enlarged, the entire image file corresponding to the image data including the portion is transferred from the server to the client.

As described above, since each image file has a very large data amount, a long time is required for data transfer. Consequently, a long time is required after an enlargement/reduction instruction is issued from the client until the image is actually displayed. Especially when the network connecting the server to the client has a low transfer rate (when a personal computer is used as a client machine, the network inherently supported by a personal computer often has a low transfer rate), a very long time is required.

Even after file transfer, to display a detailed part of the entire image data which has been transferred in units of files, the entire image data must be temporarily developed on a memory, and only necessary image data must be extracted therefrom. This requires a large capacity of a work memory, and also a long time for extraction processing.

In addition, in the apparatus of this type using a disk library unit for storing image files, disk exchange for file read access takes a long processing time regardless of whether a detail is to be enlarged. For this reason, the time required after an image read instruction is issued until the image is actually displayed is prolonged. Particularly, when disk exchange is frequently performed in response to random access requests, the processing time until image display is greatly prolonged.

In this case, the display screen does not change during processing after an image zooming instruction is issued from the client. When the zoomed image is generated as instructed, the displayed image is switched to the zoomed image. For this reason, the user sometimes forgets the zooming target portion during the long-time zooming processing after the zooming instruction is issued. In addition, since no change is observed on the screen during the zooming processing, the user waiting for the processing may become irritated.

These problems are not limited to the above-described client/server system. An apparatus which performs digital signal processing for image data stored in one unit to zoom in or out the image is also proposed. However, in the apparatus of this type, digital processing for zooming takes a long time. For this reason, during processing after the zooming instruction is issued, the user may sometimes forget the zooming target portion or become irritated.

To perform the above processing of enlarging a detail of the image at a high speed, an image file storing detailed image data may be prepared in advance. However, portions that the user requests to enlarge are finite, and it is not practical to predict all such portions and store image files thereof. Because of the limited storage capacity, portions which can be enlarged are undesirably typified.

In the system or apparatus of this type, one image data is required to be displayed at various resolutions. For example, in addition to reduction of the entire image, a plurality of low-resolution reduced image information corresponding to original image data are simultaneously displayed on the screen as list icons such that a desired one of a plurality of stored image files can be easily found. There is also a requirement for displaying a coarse image for layout to cope with works in design industries or the like.

To deal with the requirement for displaying one image data at various resolutions, image data having various resolutions may be prepared in advance and stored independently of the original image file. With this method, since image data having various resolutions are prepared in advance, display processing can be performed at a relatively high speed. However, the amount of image data to be stored becomes enormous, resulting in an overall increase in storage capacity of the apparatus.

SUMMARY OF THE INVENTION

It is the first object of the present invention to perform processing of zooming an arbitrary portion in an entire image and displaying the image at an original precision at a high speed without increasing the storage capacity.

It is the second object of the present invention to clarify the zooming target portion of an image and reduce the stress of the user during zooming processing.

It is the third object of the present invention to allow processing of displaying one image data at various resolutions without increasing the entire storage capacity.

It is the fourth object of the present invention to allow processing of displaying one image data at various resolutions at a high speed without increasing the entire storage capacity.

It is the fifth object of the present invention to increase the rate for reading out data from a low-speed secondary storage unit such as a disk library unit which requires disk exchange.

It is the sixth object of the present invention to apply a means for speeding up the data read from the low-speed secondary storage unit independently of an application program.

According to an aspect of the present invention, there is provided a data reading method applied to a network system in which an image data storage device and an access device are connected, comprising steps of designating an arbitrary portion of image data displayed on the access device, reading out only the arbitrary portion designated as the access device from image data stored in the storage device in response to a request from the access device, and transferring the arbitrary portion to the access device through a network.

According to another aspect of the present invention, there is provided a data reading apparatus applied to a network system in which an image data storage device and an access device are connected, comprising interpretation means for interpreting a request signal sent from the access device, to know what region in image data stored in the access device is requested to be read out, and image read means for reading out only an arbitrary portion of image data stored in the storage device in accordance with an interpretation result from the interpretation means and transferring the arbitrary portion to the access device through a network.

According to still another aspect of the present invention, there is provided a network system in which an image data storage device and an access device are connected, the access device comprises region designation means for designating an arbitrary partial region of entire image data stored in the storage device, and request means for transferring the partial region designated by the region designation means to the storage device through a network as a request signal. The storage device comprises interpretation means for interpreting the request signal sent from the access device to know what region in image data stored in the access device is requested to be read out, and image read means for reading out image data in the designated partial region from the stored image data in accordance with an interpretation result from the interpretation means and transferring the read-out image data to the access device through the network.

According to the present invention having the above arrangements, when a request for using a partial region is issued on the image data access device side, only image data in the requested partial region is dynamically extracted on the image data storage device and transferred instead of transferring the entire file including the corresponding image data. With this processing, the amount of data to be transferred can be decreased. In addition, since the partial region of image data is dynamically extracted, all partial regions to be used need not be predicted, and image data in these regions need not be prepared and stored in advance.

According to still another aspect of the present invention, the image data access device in the network system further comprises image zooming means for, while the image read means in the storage device is reading/transferring the image data in the partial region, performing digital signal processing for image data which has already been stored in the access device, thereby sequentially displaying a plurality of steps of zoomed images generated by changing stepwise a zoom ratio of an image which is currently being displayed, and display is switched to the image data transferred by the image read means after the image is zoomed to a full size of a display screen of the access device.

According to this aspect of the present invention having the above arrangement, after enlargement of a partial region is instructed on the image data access device; until the enlarged image is displayed at the proper resolution, the process of gradually zooming the image in the partial region is displayed.

According to still another aspect of the present invention, there is provided a data reading method applied to a network system in which an image data storage device and an access device are connected, comprising steps of, when image data stored in the storage device is to be read out, performing conversion of the image data into image data having a resolution corresponding to a request from the access device, and transferring the converted image data to the access device through a network.

According to still another aspect of the present invention, there is provided a data reading apparatus applied to a network system in which an image data storage device and an access device are connected, comprising interpretation means for interpreting a request signal sent from the access device to know what resolution image data stored in the storage device is requested to be displayed at, and image read means for, when the image data stored in the storage device is to be read out, converting the image data into image data having a resolution corresponding to the request from the access device in accordance with an interpretation result from the interpretation means and transferring the converted image data to the access device through a network.

According to still another aspect of the present invention, there is provided a network system in which an image data storage device and an access device are connected. The access device comprises resolution designation means for designating a resolution to display an image at a desired resolution, and request means for transferring information designated by the resolution designation means to the storage device through a network as a request signal. The storage device comprises interpretation means for interpreting the request signal sent from the access device to know what resolution image data stored in the storage device is requested to be displayed at, and image read means for, when the image data stored in the storage device is to be read out, converting the image data into image data having a resolution corresponding to the request from the access device in accordance with an interpretation result from the interpretation means and transferring the converted image data to the access device through the network.

According to this aspect of the present invention having the above arrangement, when a request for displaying an image at a certain resolution is issued on the image data access device side, image data having the original resolution and stored in the storage device is dynamically resolution-converted on the storage device and then transferred to the access device. With this arrangement, an image can be displayed at various resolutions only by storing the image data having the original resolution without independently preparing and storing image data having various resolutions in advance.

According to still another aspect of the present invention, there is provided an image zooming method of zooming a displayed image by digital signal processing, comprising steps of repeatedly performing, in zooming in an image, processing of generating, from the image in a region as a zooming target, an image at a zoom ratio between a current zoom ratio and a final zoom ratio and displaying the image while changing the zoom ratio stepwise until the zoom ratio, and superimposing the image generated with changing the zoom ratio stepwise, on the original image before zooming.

According to still another aspect of the present invention, there is provided an image zooming method of zooming a displayed image by digital signal processing, comprising steps of repeatedly performing, in zooming out an image, processing of generating, from the image in a region as a zooming target, an image at a zoom ratio between a current zoom ratio and a final zoom ratio and displaying the image while changing the zoom ratio stepwise until the zoom ratio reaches the final zoom ratio, and, when the zoom ratio reaches the final zoom ratio, displaying the image zoomed out by the final zoom ratio in an entire display frame, including an image portion which has not been displayed before the zoom out reaches the final zoom ratio.

According to the present invention having the above arrangement, the original image can be prevented from being suddenly switched to the image at the final zoom ratio when a certain time has elapsed after the image zooming instruction is issued. Instead, the process of gradually zooming the target image to the final zoomed image is displayed. Therefore, the zooming target portion can be visually confirmed even during the zooming processing.

According to still another aspect of the present invention, there is provided an image data storage method of storing image data in a storage medium, comprising steps of dividing data on all scan lines constituting an original image, into a plurality of resolution components by considering data on each group of scan lines at equal intervals in the data on all scan lines constituting the original image to be one unit of resolution component data, and putting together the data on scan lines of each different width of the equal interval, rearranging the plurality of resolution component data such that data belonging to the same resolution component are put together and data of a lower resolution component with a wider width than the regular interval is stored in an upper layer of the storage area of the storage medium while data of a higher resolution component with a narrower width than the regular interval is stored in a lower layer of the storage area of the storage medium, and hierarchically storing the respective resolution component data in a storage area of the storage medium.

According to the present invention having the above arrangement, one original image data is divided into a plurality of resolution components and hierarchically stored in the storage medium in advance. Therefore, when a request for displaying an image at a certain resolution is issued, an image having the requested resolution can be obtained only by reading out the necessary resolution component for realizing the requested resolution without performing cumbersome resolution conversion processing.

According to still another aspect of the present invention, there is provided an image data storage method of storing image data in a storage medium, comprising steps of rearranging data of scan lines constituting an original image such that data belonging to the same resolution component are put together, and hierarchically storing the respective resolution component data in a storage area of the storage medium.

According to this aspect of the present invention having the above arrangement, data compression processing can be performed in units of scan lines, so that a high compression ratio can be achieved using the identity or similarity of pixel data present on the scan lines. In addition, data read processing can also be performed in units of scan lines. Therefore, even when a request for extracting an arbitrary portion in image data is issued, only corresponding scan line data need be read out and developed on the memory in extraction processing, so the entire image data need not be developed.

According to still another aspect of the present invention, in the image data storage method, lower-resolution component data is stored in an upper layer of the storage area of the storage medium, and higher-resolution component data is stored in a lower layer of the storage area of the storage medium.

According to this aspect of the present invention having the above arrangement, low-resolution component data whose use frequency is low is stored in an area with a smaller address number, and high-resolution component data whose use frequency is high is stored in an area with a larger address number. For this reason, each resolution component data can be more smoothly read out.

According to still another aspect of the present invention, in the image data storage method, the plurality of resolution component data divided from the original image data are stored in a plurality of storage media.

According to this aspect of the present invention having the above arrangement, high-resolution component data whose amount is large and use frequency is low can be stored in a large-capacity storage medium, and low-resolution component data whose amount is small and use frequency is high can be stored in a storage medium which allows high-speed read access. With this arrangement, even when all the resolution component data cannot be stored in a storage medium which allows high-speed access because of the limited data capacity, the rate for reading out at least data with a high use frequency can be increased.

According to still another aspect of the present invention, there is provided an image data writing/reading system comprising data division means for dividing data on all scan lines constituting an input original image, into a plurality of resolution components by considering data on each group of scan lines at equal intervals in the data on all scan lines constituting the original image to be one unit of resolution component data, and putting together the data on scan lines of each different width of the equal interval, data storage means for rearranging the plurality of resolution component data divided by the data division means such that data belonging to the same resolution component are put together, and hierarchically storing the respective resolution component data in a storage area of the storage medium, data read means for reading out only one of the respective resolution component data stored in the storage medium by the data storage means in correspondence with a request from a user, and image display means for displaying an image on the basis of the data read out by the data read means.

The data read means has prefetch means for, when a request for reading out data is issued, developing in advance another data associated as data which is likely to be read out next to the requested data in accordance with a predetermined rule from a storage medium whose read rate is low to a storage medium whose read rate is high.

According to the present invention having the above arrangement, even when a request for reading out certain data is actually issued for the first time, the corresponding data can be read out not from the low-speed storage medium but from the high-speed storage medium as far as the data has already been developed from the low-speed storage medium to the high-speed storage medium in preceding processing of reading out another data. Therefore, not only for data having a high use frequency but also for data having a relatively low use frequency, the read processing time can be substantially shortened.

According to still another aspect of the present invention, there is provided a data reading method comprising the steps of dividing data on all scan lines constituting an original image into a plurality of resolution components by considering data on each group of scan lines at equal intervals in the data on all scan lines constituting the original image to be one unit of resolution component data, putting together the data on scan lines of each different width of the equal interval, rearranging the plurality of resolution component data such that data belonging to the same resolution component are put together and data of a lower resolution component with a wider width than the regular interval is stored in an upper layer of the storage area of a storage medium while data of a higher resolution component with a narrower width than the regular interval is stored in a lower layer of the storage area of the storage medium, and developing in advance, when a request for reading out data of a low resolution component, is issued to the storage medium, another data of a higher resolution component associated as data which is likely to be read out next to the requested low resolution component data in accordance with a predetermined rule from a low-speed storage unit to a high-speed storage unit.

According to the present invention having the above arrangement, even when a request for reading out certain data is actually issued for the first time, the corresponding data can be read out not from the low-speed storage unit but from the high-speed storage unit as far as the data has already been developed from the low-speed storage unit to the high-speed storage unit in preceding processing of reading out another data. With this arrangement, the rate for reading out data from the low-speed storage unit can be substantially increased. Processing of developing data in advance is performed on the basis of the rule defined to associate the data as data which is likely to be read out next. For this reason, even in response to a read request issued for the first time, the high-speed storage unit can often be accessed to read out the data, so the data read processing time can be shortened as a whole.

Besides, according to the present invention, since each unit of original image data is beforehand divided into a plurality of resolution components and stored in the storage medium in a hierarchical structure, an image having a necessary resolution can be obtained only by reading out the necessary resolution component for realizing the necessary resolution without performing cumbersome resolution conversion processing.

According to still another aspect of the present invention, there is provided a data reading method of developing data in advance while causing an operating system applied to a computer to interpret the predetermined rule.

According to this aspect of the present invention having the above arrangement, processing of developing data from the low-speed storage unit to the high-speed storage unit is performed at the level of the operating system applied to the computer without mediacy of the application program. Therefore, the application program need not be modified to incorporate this function, and the function can be readily optionally incorporated in any application program.

BRIEF DESCRIPTION OF THE DRAWINGS

FIG. 4 is a flow chart showing processing procedures of an image zoom-in method according to the first and second embodiments of the present invention;

FIG. 5 is a flow chart showing processing procedures of an image zoom-out method according to the first and second embodiments of the present invention;

FIG. 14 is a view for explaining a prefetch function;

FIG. 15 is a view showing examples of a rule used for prefetch processing;

FIG. 16 is a view showing prefetch processing on the OS level for realizing a data reading method according to the fourth embodiment of the present invention;

FIG. 17 is a block diagram showing the functional arrangement of a prefetch driver shown in FIG. 16;

DETAILED DESCRIPTION OF THE PREFERRED EMBODIMENTS

-First Embodiment-

The first embodiment of the present invention will be described first with reference to the accompanying drawings.

Figure 1:
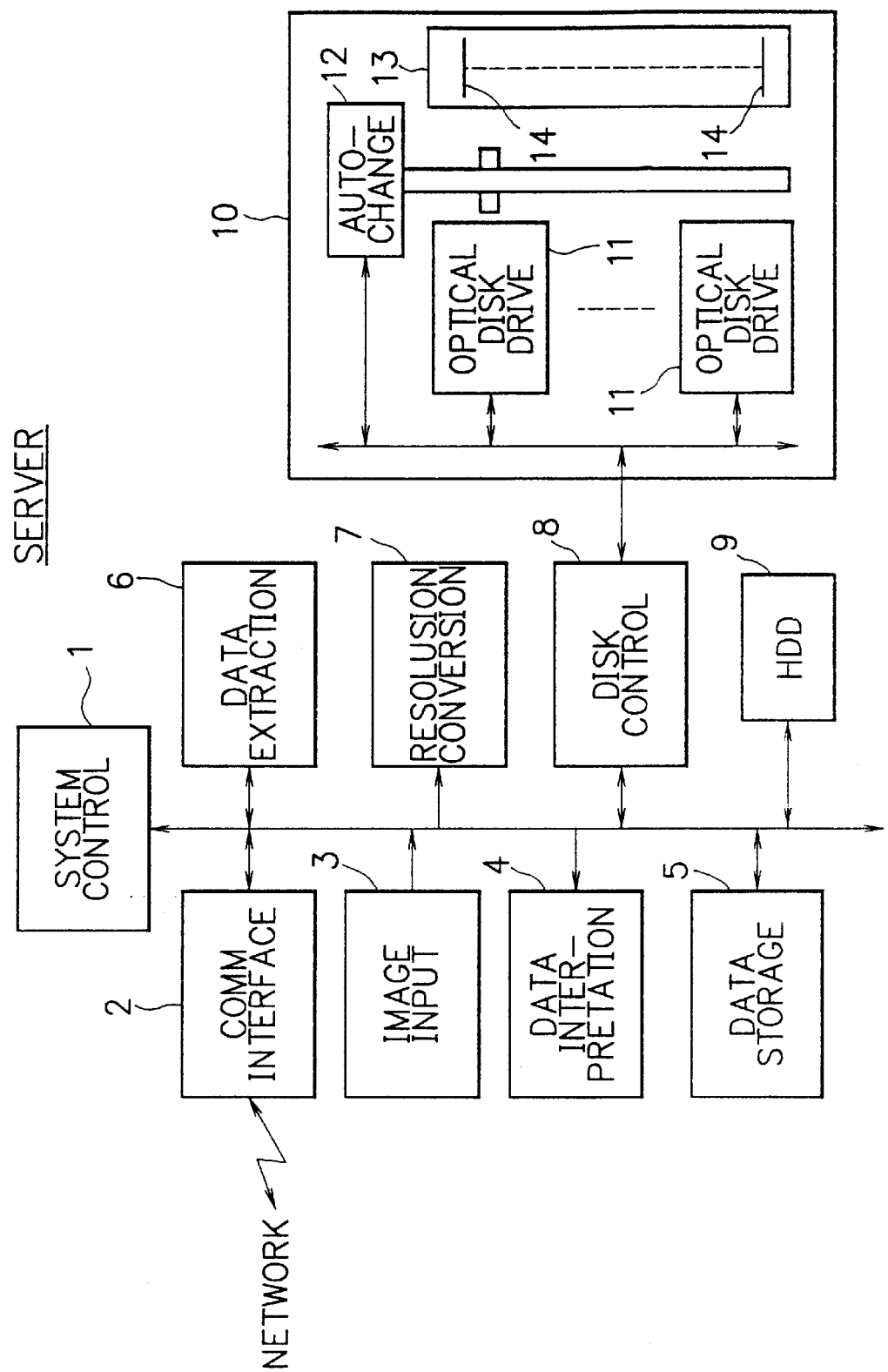
FIG. 1 is a block diagram showing the arrangement of a server machine constituting a network system according to the first embodiment of the present invention.
Figure 2:
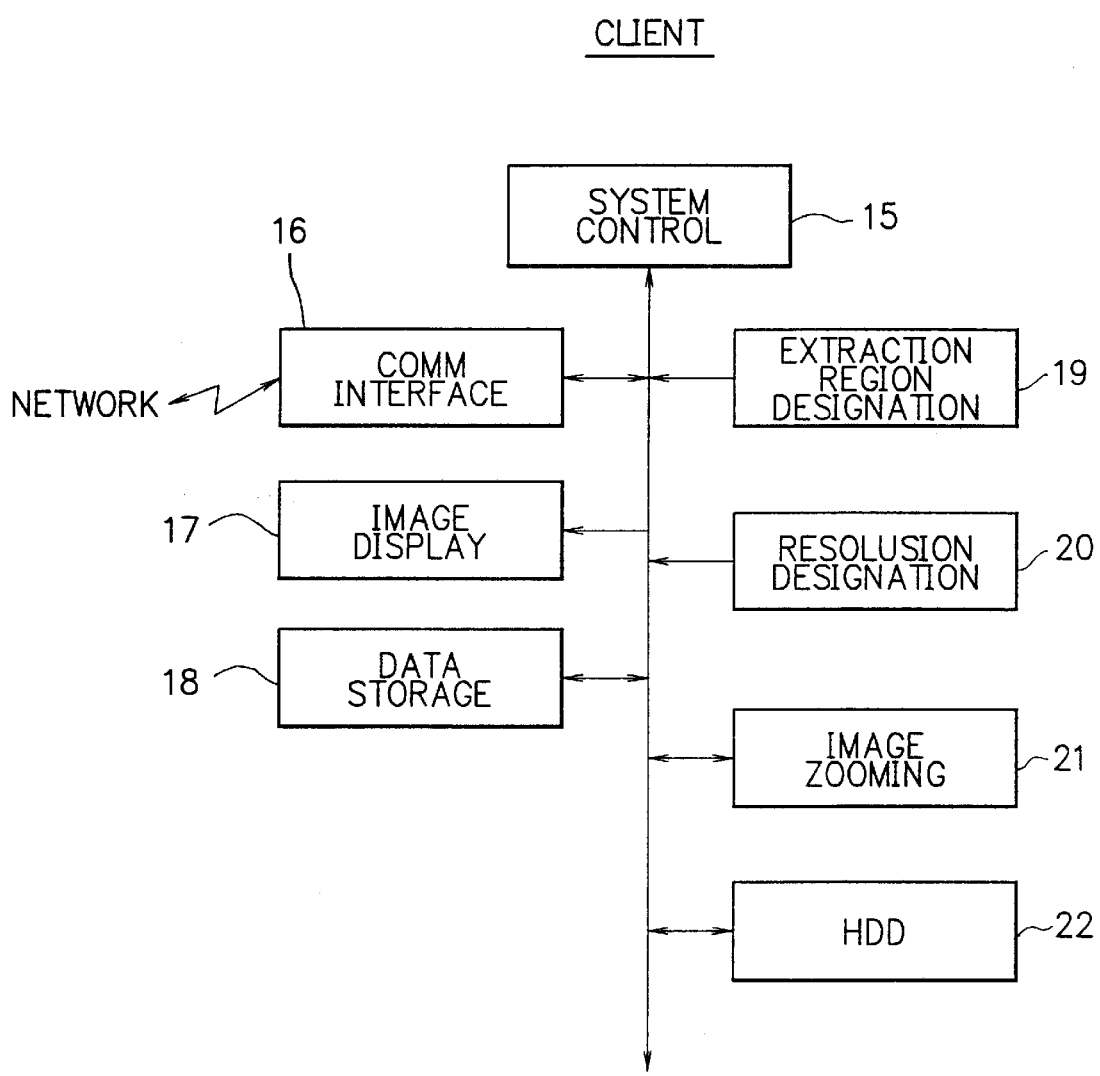
FIG. 2 is a block diagram showing the arrangement of a client machine constituting the network system according to the first embodiment of the present invention.

FIGS. 1 and 2 are block diagrams showing the arrangement of a network system according to the first embodiment. As shown in FIGS. 1 and 2, this embodiment shows a client/server system constituted by a server (storage device) for storing a large quantity of image data (not only the number of image files but also the data amount of each image file is large) and a client (access or use device) for displaying image data read out from the server.

As shown in FIG. 1, the server machine comprises a system control section 1, a communication interface 2, an image input section 3, a data interpretation section 4, a data storage section 5, a data extraction section 6, a resolution conversion section 7, a disk control section 8, a hard disk (HDD) 9, and a disk library unit (jukebox) 10.

The jukebox 10 comprises a magazine 13 for storing a plurality of magnetooptical disks (MOs) 14, a plurality of optical disk drives 11, and an auto-change mechanism 12. The optical disk drives 11 perform image data read/write processing for the MOs 14 stored in the magazine 13. Read-only media such as compact disks may be used.

The auto-change mechanism 12 exchanges the MOs 14 under the control of the disk control section 8. More specifically, the auto-change mechanism 12 extracts the MO 14 designated by the disk control section 8 from the magazine 13 and loads the MO 14 in the corresponding optical disk drive 11, or stores, in the magazine 13, the MO 14 loaded in the optical disk drive 11 and designated by the disk control section 8.

Normally, one image data is stored in one MO 14 as an image file. However, when the amount of image data constituting one image file is larger than the storage capacity of one MO 14, the image data is divided and stored in the plurality of MOs 14.

In the jukebox 10 having the above arrangement, disks are exchanged in accordance with an instruction from the client, and a required image file is read out through the disk control section 8.

The system control section 1 controls the entire server system. The program therefor is stored in the HDD 9. The communication interface 2 performs communication of image data or a request signal with the client machine shown in FIG. 2. The image input section 3 inputs image data to be stored in the jukebox 10. An image input device such as an image scanner or a video camera using, e.g., a CCD is used as the image input section 3.

The data interpretation section 4 interprets a request signal sent from the client machine. The request signal represents, e.g., a region designated, as a region to be enlarged, on an image currently displayed on the display screen on the client side. The signal sometimes represents a request for reducing the entire image to display a wider or full range of image data, or a request for displaying image data at a certain resolution. The data interpretation section 4 interprets the request signal and transmits the interpretation result to the system control section 1.

The data storage section 5 temporarily stores image data read out from the jukebox 10 through the disk control section 8. The HDD 9 may be commonly used as the data storage section 5. Image data stored in the data storage section 5 is used for processing in the data extraction section 6 or the resolution conversion section 7. That is, the data storage section 5 functions as a work memory for processing in the data extraction section 6 or the resolution conversion section 7.

The data extraction section 6 extracts image data in a partial region interpreted by the data interpretation section 4 from the entire image data read out from the jukebox 10 and stored in the data storage section 5. Only the image data in the extracted partial region is supplied to the communication interface 2 and transferred to the client machine through the network.

The resolution conversion section 7 converts image data read out from the jukebox 10 and stored in the data storage section 5 into image data having a resolution interpreted by the data interpretation section 4. When image icons for searching for image files or coarse images for layout, or an image in a wider range beyond the display screen on the client side is to be displayed, processing to lower the original resolution of the image data stored in the data storage section 5, e.g., thinning is performed. Resolution-converted image data is supplied to the communication interface 2 and transferred to the client machine through the network.

Lowering the resolution means lowering the DPI (Dot Per Inch) of the image data itself without changing the DPI of the displayed image, so that the image is substantially reduced. Similarly, increasing the resolution means enlargement of an image.

In this embodiment, the image data reading apparatus of the present invention is included in the server machine and mainly constituted by the system control section 1, the communication interface 2, the data interpretation section 4, the data storage section 5, the data extraction section 6, the resolution conversion section 7, and the disk control section 8. The system control section 1, the data interpretation section 4, the data extraction section 6, and the resolution conversion section 7 are actually formed by a microcomputer constituted by a CPU, a ROM, a RAM, and the like.

As shown in FIG. 2, the client machine connected to the server machine through the network comprises a system control section 15, a communication interface 16, an image display section 17, a data storage section 18, an extraction region designation section 19, a resolution designation section 20, an image zooming section 21, and an HDD 22.

The system control section 15 controls the entire client system. The program therefor is stored in the HDD 22. The communication interface 16 performs communication of image data or a request signal with the server machine shown in FIG. 1 through the network. The image display section 17 displays image data. A display device such as a CRT, an LCD, or a plasma display is used as the image display section 17.

The data storage section 18 temporarily stores image data which is currently displayed on the image display section 17. The image data stored in the data storage section 18 is used for zooming processing to be performed by the image zooming section 21. The extraction region designation section 19 designates an arbitrary partial region of the entire image displayed on the image display section 17, or, when the image displayed on the image display section 17 is to be zoomed out to display a wider image, designates a region for zoomed-out image.

As described above, when a detail of a photographic image is to be checked, or a specific component portion of a drawing is to be precisely referred to, the desired region is designated using the extraction region designation section 19 such that the detailed image is enlarged and displayed on the full screen at the original precision. Inversely, the extraction region designation section 19 is also used to return the enlarged image of a detail to the original wide image. When the desired region is designated by the extraction region designation section 19, this is transferred as a request signal from the communication interface 16 to the server shown in FIG. 1 through the network.

The partial region to be enlarged may be freely designated by clicking the mouse at the central point or an arbitrary point of a desired rectangular region (the region has similar shape to the display screen, and the similitude ratio is determined in advance) or dragging the mouse to set a region having an arbitrary shape. In addition, the image region to be zoomed out may be freely designated by clicking the mouse at the central point or an arbitrary point of the region. The method of designating the region to be extracted is not particularly limited.

The resolution designation section 20 designates a desired resolution for an image to be displayed on the image display section 17. The resolution designation section 20 is used when an image is to be displayed at various resolutions, e.g., a low-resolution image such as an image icon for searching for an image file or a coarse image for layout, or an intermediate-resolution image representing the entire image is to be displayed.

For designation of the resolution, one of a plurality of steps of resolutions (e.g., a high resolution, an intermediate resolution, and a low resolution) may be directly designated. Alternatively, a resolution may be designated by clicking the mouse on a menu or an icon for designating display of an image icon or a coarse image for layout. The method of designating the resolution is not particularly limited. When a desired resolution is designated by the resolution designation section 20, this is transferred as a request signal from the communication interface 16 to the server shown in FIG. 1 through the network.

The image zooming section 21 sequentially displays a plurality of steps of zoomed images generated, from the image in a partial region designated by the extraction region designation section 19 to be enlarged or zoomed out, by changing the zoom ratio stepwise by digital signal processing on the basis of image data stored in the data storage section 18. This processing will be described later in detail.

In the above network system, programs for realizing the function of the present invention are stored in the HDDs 9 and 22 in advance. However, these programs may be supplied from an external device to the network system of this embodiment. In this case, a means for supplying the program, e.g., a storage medium storing the program is included in the present invention. As the storage medium storing the program, a ROM, a floppy disk, an optical disk, a magnetooptical disk, a CD-ROM, a magnetic tape, or a nonvolatile memory card can be used in addition to the HDD.

The operation of the network system of this embodiment having the above arrangement will be described next.

When certain image data is being displayed on the image display section 17 on the side of the client: shown in FIG. 2, a region where, e.g., a detail is to be enlarged is designated by the extraction region designation section 19. The designated region is transferred, as a request signal, to the server shown in FIG. 1 through the network.

On the server side, the received request signal is interpreted by the data interpretation section 4, and the interpretation result is transmitted to the system control section 1. The data extraction section 6 is controlled in accordance with the interpretation result so that image extraction processing is performed. At this time, the data extraction section 6 extracts only image data in the partial region (region designated by the extraction region designation section 19 on the client side) interpreted by the data interpretation section 4 from image data stored in the data storage section 5.

The image data in the extracted partial region is supplied to the communication interface 2 and transferred to the client through the network. The image data in the partial region transferred from the server to the client is enlarged and displayed on the full display screen of the image display section 17. To further enlarge the image, a region to be enlarged may be designated in a similar manner. With this processing, the user can check a detail of a photographic image or refer to a specific component portion of a drawing in detail.

As described above, in this embodiment, when a request for enlarging a partial region is issued on the client, only image data in the requested partial region is dynamically extracted on the server and transferred instead of transferring the entire image data file including image data in the partial region. With this arrangement, the amount of data to be transferred on the network can be decreased, so that the time required for transfer can be greatly shortened. As a result, the time after the enlargement instruction is issued on the client until the image is actually displayed can be shortened. Particularly when the network connecting the server to the client has a low transfer rate, the time can be greatly shortened.

In this embodiment, as described above, image data in a partial region is dynamically extracted. For this reason, all partial regions to be enlarged need not be predicted in advance to prepare detailed image data, and image files storing the detailed image data need not be prepared independently of the entire image file. Therefore, an arbitrary region can be freely enlarged without increasing the storage capacity on the server.

An operation of displaying one image at various resolutions will be described next.

When a designation is made by the resolution designation section 20 on the client side shown in FIG. 2 to display an image at a certain resolution, the designated resolution is transferred, as a request signal, to the server shown in FIG. 1 through the network.

On the server side, the received request signal is interpreted by the data interpretation section 4, and the interpretation result is transmitted to the system control section 1. The system control section 1 controls the resolution conversion section 7 in accordance with the interpretation result so that image resolution conversion is performed. At this time, the resolution conversion section 7 lowers the resolution to the requested ones using image data having the original resolution and stored in the data storage section 5. When an image icon for searching for an image file or a coarse image for layout is to be displayed, processing such as thinning is performed to lower the resolution, thereby forming reduced image information.

The image data which has undergone resolution conversion is supplied to the communication interface 2 and transferred to the client through the network. The image data after resolution conversion, which is transferred from the server to the client, is displayed on the display screen of the image display section 17.

As described above, in this embodiment, when a request for displaying an image at various resolutions is issued on the client, resolution conversion is dynamically performed on the server to obtain an image having the requested resolution, and the resolution-converted image is transferred. With this arrangement, an image can be displayed at various resolutions only by storing image data with the original resolution without independently preparing image data having various resolutions and storing these image data. Therefore, an image can be displayed at various resolutions in accordance with a request without increasing the storage capacity on the server.

In the above embodiment, image data extraction processing and resolution conversion processing on the server are performed using image data read out from the jukebox 10 and stored in the data storage section 5. However, when the data extraction section 6, the disk control section 8, the resolution conversion section 7, and the disk control section 8 are caused to cooperate with each other to read out image data corresponding to a desired portion from the jukebox 10, the same function as described above can be realized.

Both in enlargement of a detail of an image and in display of an image at various resolutions, image data transferred from the server to the client corresponds to part of an image file. Therefore, the transfer time can be shortened as compared to the prior art, and consequently, the time after an instruction is issued on the client until the image is actually displayed can be shortened. However, this processing still takes some time, and in this embodiment, the image zooming section 21 is arranged on the client side such that an operation as described below is enabled in addition to the above-described operation.

While image data in a partial region designated in the above-mentioned way is being read out/transferred, the image zooming section 21 performs digital signal processing for image data (e.g., image data currently displayed and corresponding to the designated region to be enlarged) stored in the data storage section 18, thereby sequentially displaying a plurality of steps of zoomed images generated by changing the zoom ratio stepwise on the basis of the image which is currently being displayed.

Figure 3A:
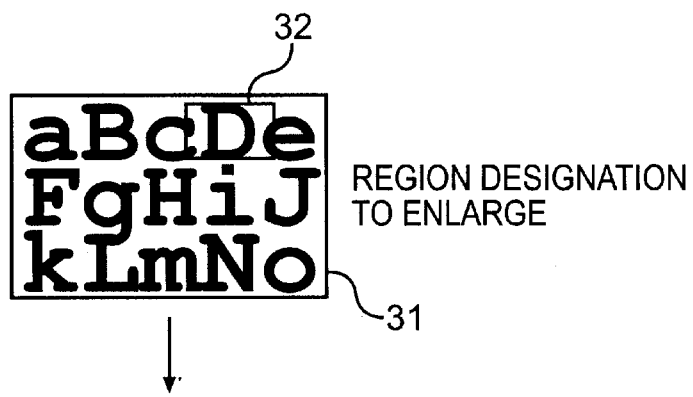
FIGS. 3A to 3E are views for explaining an example of the image enlargement/display operation.

This processing will be described with reference to FIGS. 3A to 3E. FIG. 3A shows an original image before enlargement. A rectangular frame 31 indicates a display window displayed on the full display screen or at a portion of the screen where an image is displayed on the image display section 17 (to be referred to as the display frame 31 hereinafter). Letters "aBcDe . . . " shown in FIG. 3A are image data.

Figure 3B:
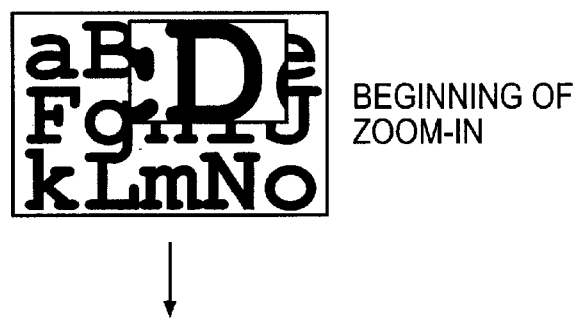
Figure 3C:
Figure 3D:

On the displayed image shown in FIG. 3A, when a region to be enlarged is designated by dragging the mouse, as indicated by a rectangular frame 32 having a similar shape to the display frame 31, the image in the designated region is subjected to digital signal processing. The image is gradually zoomed in, as shown in FIGS. 3B, 3C, and 3D, and finally displayed in the entire display frame 31. The image shown in FIG. 3D is generated by digital signal processing using the image shown in FIG. 3A itself, so the image has a low resolution.

First, the image in the rectangular region 32 designated as a zooming target is displayed as an image having a lower resolution than that of the original image shown in FIG. 3A and zoomed in by a predetermined magnification, as shown in FIG. 3B. Next, a further zoomed-in image having a lower resolution than of the image shown in FIG. 3B is displayed, as shown in FIG. 3C. Thereafter, an image enlarged by a final zoom ratio and having a lower resolution than that of the image shown in FIG. 3C is displayed in the entire display frame 31, as shown in FIG. 3D.

More specifically, in this embodiment, zoom-in processing is performed in accordance with the procedure shown in FIG. 4.

In step S1 of FIG. 4, the region 32 to be enlarged is designated from the entire image displayed on the display frame 31. The region may be designated by clicking the mouse at the central point of the rectangular region 32 as a zooming target (in this case, the size of the rectangular region is determined in advance). Alternatively, the rectangular region 32 may be freely designated by dragging the mouse.

The rectangular region 32 to be enlarged is designated in step S1. Next, in step S2, a rectangular region whose four corners are obtained by interpolating, by a predetermined interpolation ratio, the space between the four corners of the designated rectangular region 32 and those of a rectangular region (in this case, the display frame 31) where the image in the rectangular region 32 is to be displayed at the final zoom ratio is set as a drawing region. The image in the designated rectangular region 32 is zoomed to the size of the drawing region and displayed. With this processing, the image is displayed, as shown in FIG. 3B.

In step S3, it is determined whether the image (zooming target) in the rectangular region 32 designated in step S1 is enlarged to the entire display frame 31. If NO in step S3, the flow advances to step S4 to increase the interpolation ratio and then returns to step S2 to perform the same processing as described above.

In FIG. 3B, the image in the designated rectangular region 32 has not been enlarged to the entire display frame 31 yet. Therefore, the flow advances to step S4 and then returns to step S2. With this processing, an image having a higher interpolation ratio than that of the image shown in FIG. 3B, i.e., a further zoomed-in image having a lower resolution is displayed, as shown in FIG. 3C.

When the image in the designated rectangular region 32 is enlarged to the entire display frame 31, as shown in FIG. 3D, by repeating, the processing in steps S2 to S4, the zoom-in processing is ended without advancing to step S4.

Figure 3E:
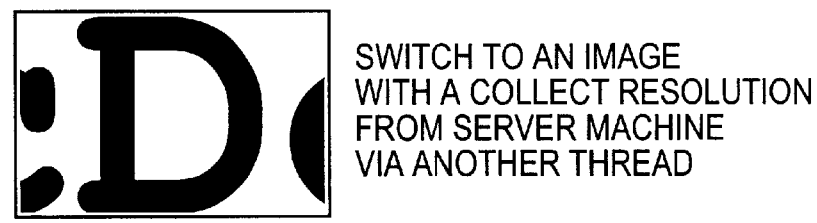

When zooming is ended, as shown in FIG. 3D, the image shown in FIG. 3D is replaced with an image having a proper resolution as shown in FIG. 3E, which is loaded from the server in another thread. If loading of the image from the server is not complete yet at the time of completion of zooming in FIG. 3D, the image having a lower resolution as shown in FIG. 3D is continuously displayed until loading is complete.

With this processing, after the enlargement instruction is issued on the client until the zoomed image is displayed at a proper resolution, the process of gradually zooming the image in the designated region is displayed. Therefore, the user can clearly visually grasp the zooming target portion even during the time after image enlargement is instructed until the enlarged image is displayed at the original resolution. In addition, the lapse of time in waiting for image loading from the server can be effectively shortened, and the stress of the user during the processing can be reduced.

When an image currently displayed on the image display section 17 on the client side is to be zoomed out to display a wider range, the above-described zooming processing can be applied. More specifically, until image data in the designated wide range is read out on the server and transferred to the client, stepwise zoom-out processing is performed using image data stored in the data storage section 18 of the client. When the image data in the wide range is transferred from the server, the image obtained by zoom-out processing is replaced with the transferred image.

FIG. 5 is a flow chart showing the procedures of stepwise zoom-out processing according to this embodiment. In step S11 of FIG. 5, a region where the entire image currently displayed in the display frame 31 is to be reduced and the zoomed-out image is to be displayed is designated. This region may be designated by clicking the mouse at the central point or an arbitrary point of the rectangular region (the region has similar shape to the display frame 31, and the similitude ratio is determined in advance) where the image reduced in the display frame 31 is to be displayed.

The rectangular region where the image currently displayed in the display frame 31 is to be reduced is designated in step S11. Next, in step S12, a rectangular region whose four corners are obtained by interpolating, by a predetermined interpolation ratio, the space between the four corners of the rectangular region (in this case, the display frame 31) as a zooming target and those of the rectangular region (in this case, the designated rectangular region where the reduced image is to be displayed) where the image in the rectangular region is to be displayed at the final zoom ratio is set as a drawing region. The image in the display frame 31 is reduced to the size of the drawing region and displayed.

In step S13, it is determined whether the image in the display frame 31 is reduced to the size of the rectangular region designated in step S11, i.e., whether the size of the rectangular region designated in step S11 equals that of the current drawing region. If NO in step S13, the flow advances to step S14 to increase the interpolation ratio and then returns to step S12 to perform the same processing as described above.

Processing in steps S12 to S14 is repeated. When it is determined that the image in the display frame 31 is reduced to the size of the designated rectangular region, the flow advances from step S13 to step S15. In step S15, the zoomed-out image is displayed in the entire display frame 31 at the final reduction ratio, including an image portion which has not been displayed before reduction. More specifically, when image zoom-out processing is complete, the zoomed image is replaced with an image in a wider range, which is loaded from the server in another thread.

As described above in detail, according to the network system of the first embodiment, only an arbitrary portion of image data stored in the image data storage device is read out in accordance with a request from the access device, and transferred to the access device through the network. With this arrangement, only image data in the partial region requested on the image data access device side is dynamically extracted from the storage device and transferred to the access device. With this processing, the amount of data to be transferred can be decreased, and the transfer time can be greatly shortened. Since the partial region of the image data is dynamically extracted, all partial regions to be used need not be predicted, and the image data thereof need not be prepared and stored. According to this embodiment, processing of enlarging an arbitrary portion in the entire image and displaying the image at the original precision can be performed at a high speed without increasing the storage capacity.

In addition, in the first embodiment, the image data access device has the image zooming means for performing zooming processing while image data in a partial region is being read out/transferred. With this arrangement, after enlargement of a partial region is instructed until the enlarged image is displayed at the proper resolution, the process of gradually zooming the image in the partial region can be displayed. Therefore, the lapse of time in waiting for image loading from the server can be shortened, and the stress of the user during the processing can be reduced.

Furthermore, in the first embodiment, image data stored in the image data storage device is converted into image data having a resolution corresponding to a request from the access device and then transferred to the access device through the network. The image data having the original resolution and stored in the image data storage device is dynamically resolution-converted on the storage device in accordance with the request from the access device, and transferred to the access device. With this arrangement, instead of independently preparing and storing image data having various resolutions in advance, an image can be displayed at various resolutions only by storing image data having the original resolution. Therefore, processing of displaying one image data at various resolutions can be performed without increasing the storage capacity of the apparatus.

-Second Embodiment-

In the first embodiment, the client/server system performs stepwise zooming/display processing using image data stored on the client until image data is transferred from the server to the client. This stepwise zooming/display processing can also be applied even when image zooming processing is simply performed in a stand-alone apparatus other than the client/server system. In the second embodiment, to be described below, the stepwise zooming/display processing is applied to a stand-alone apparatus.

Figure 6:
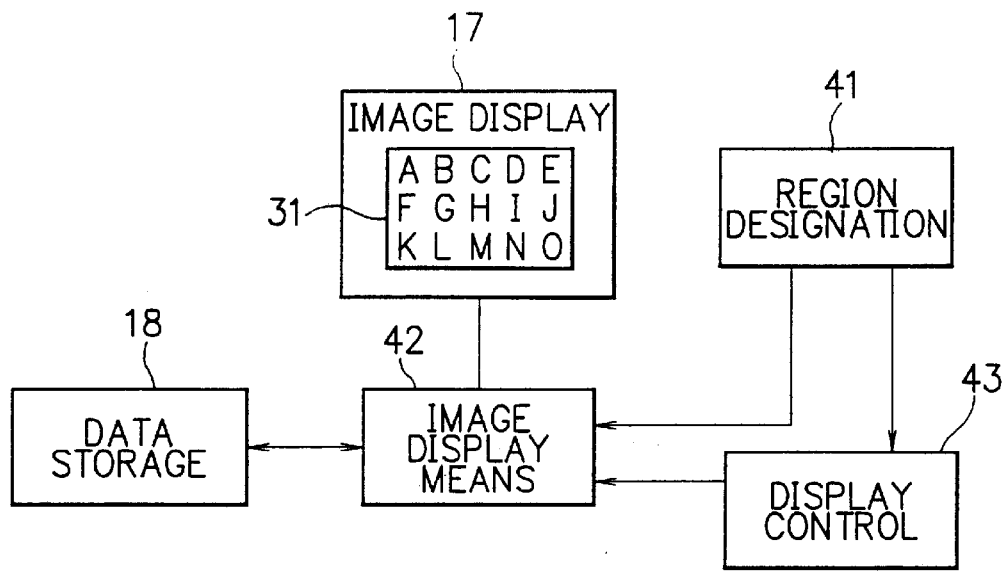
FIG. 6 is a block diagram showing the functional arrangement of an image zooming apparatus according to the second embodiment of the present invention.
Figure 7:
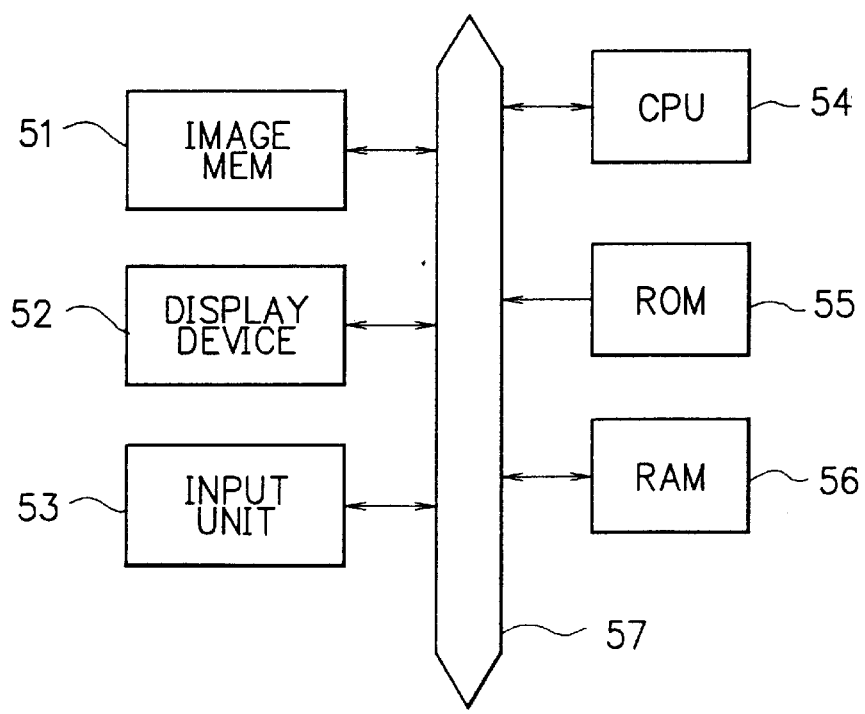
FIG. 7 is a block diagram showing a hardware configuration for realizing the functional arrangement of the second embodiment shown in FIG. 6.

FIGS. 6 and 7 are block diagrams showing the internal arrangement of the stand-alone apparatus for realizing the image zooming method as shown in FIGS. 4 and 5. FIG. 6 shows the functional arrangement of an image zooming apparatus according to this embodiment which is arranged in the stand-alone apparatus. FIG. 7 shows a hardware configuration for realizing the functional arrangement. This embodiment will be described below with reference to FIGS. 6 and 7.

Referring to FIG. 6, an image display section 17 and a data storage section 18 have the same functions as those shown in FIG. 2. More specifically, the data storage section 18 stores image data to be displayed in a display frame 31 of the image display section 17 (in FIG. 7, the image display section 17 is shown as a display device 52 such as a CRT or an LCD). In FIG. 7, the image display section 17 is constituted by an image memory 51. In the display frame 31, part of the image data stored in the data storage section 18 is zoomed in and displayed on the full screen, or the entire image data is zoomed out and displayed.

A region designation section 41 is used, in a zoom-in mode, to designate an image region as a zoom-in target from the image in the display frame 31, and in a zoom-out mode, to designate an image region where the image in the display frame 31 is to be reduced and displayed. In FIG. 7, the region designation section 41 is constituted by an input unit 53 such as a keyboard or a mouse.

An image display means 42 sets, as a drawing region, a rectangular region whose four corners are obtained by interpolating the space between the four corners of the image region designated by the region designation section 41 and those of the display frame 31 by a predetermined interpolation ratio. In the zoom-in mode, the image in the image region designated as a zoom-in target is zoomed to the size of the drawing region, and in the zoom-out mode, the image in the display frame 31 is zoomed to the size of the drawing region.

A display control means 43 performs control to change stepwise the interpolation ratio used by the image display means 42 until the image at a final zoom ratio is displayed in the entire display frame 31. The image display means 42 performs the above-described stepwise zooming processing on the basis of the interpolation ratio set by the display control means 43.

Figure 8A:
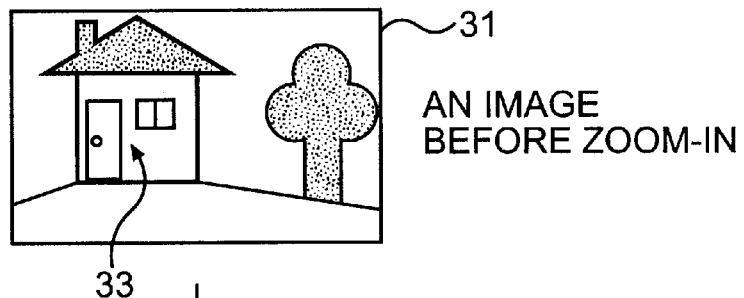
FIGS. 8A to 8D are views for explaining another example of the image enlargement/display operation.
Figure 8B:
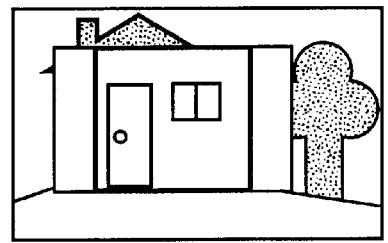
Figure 8C:
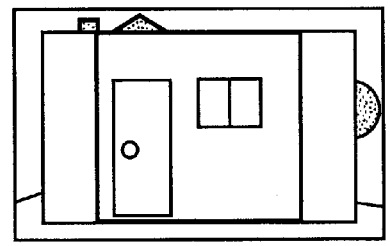
Figure 8D:
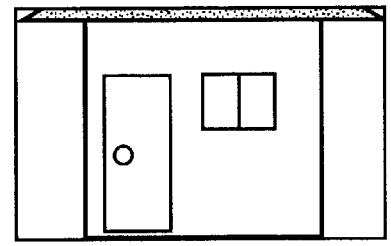

On the displayed image shown in FIG. 8A, a mouse cursor 33 is moved to the central point or an arbitrary point of a rectangular region (the region has similar shape to the display frame 31, and the similitude ratio is determined in advance) as a zooming target, and the region to be enlarged is designated by clicking the mouse. The image display means 42 performs digital signal processing for the image in the designated region. The image is gradually zoomed in, as shown in FIGS. 8B, 8C, and 8D, and finally, the image is displayed in the entire display frame 31.

In the example shown in FIGS. 8A to 8D (in the example shown in FIGS. 3A to 3D as well), the image in the drawing region sequentially generated by changing the interpolation ratio is superposed on the original image before zooming. However, only the image in the rectangular region as a zooming target may be gradually zoomed in/out and displayed.

In the example shown in FIGS. 8A to 8D (in the example shown in FIGS. 3A to 3D as well), images at zoom ratios of two steps are displayed between the original image and the final zoomed image. However, by changing the increase amount of the interpolation ratio, images at zoom ratios of arbitrary steps can be displayed. In this case, when a larger number of interpolated images are displayed by reducing the increase amount of the interpolation ratio, a process of more smoothly zooming the image can be displayed.

The increase amount of the interpolation ratio may be determined in consideration of a balance to the processing time.

The image display means 42 and the display control means 43 shown in FIG. 6 are constituted by a CPU 54, a ROM 55, and a RAM 56, as shown in FIG. 7. The CPU 54 is a major constituent element for realizing the functions of the image display means 42 and the display control means 43. The CPU 54 performs processing of zooming the image in the display frame 31 of the image display section 17 on the basis of information of the image region designated by the input unit 53 (corresponding to the region designation section 41 in FIG. 6).

A program for realizing this function is recorded on the ROM 55. The CPU 54 can read out this program. The RAM 56 is a memory used as a working area for zooming processing and temporarily stores, e.g., image data having various resolutions generated by digital signal processing by the CPU 54.

As described above, the image zooming apparatus of this embodiment comprises a single device (e.g., a computer) constituted by connecting the constituent elements 51 to 56 via a bus 57, as shown in FIG. 7.

According to the image zooming apparatus of this embodiment, while zooming processing is being performed in accordance with a zoom-in instruction on the image shown in, e.g., FIG. 8A, the process of gradually zooming the image to the final zoomed image is displayed, as shown in FIGS. 8B and 8C, although, in the prior art, the display screen is not changed for a long time and suddenly switched to the image at the final zoom ratio shown in FIG. 8D.

Even while zooming processing is being performed after zooming is instructed on the image, the zooming target portion can be visually confirmed, and the user can clearly grasp the zooming target portion. In addition, in this embodiment, the user does not become tired with the processing because he/she can see the process of gradually zooming the image. For this reason, the stress of the user during the zooming processing can also be reduced.

When the image in the rectangular region designated as a zooming target is simply zoomed in, the image sometimes protrudes from the display frame 31 as the image is enlarged. In this embodiment, however, the image in the designated rectangular region is zoomed to the size of the drawing region formed by interpolating the space between the rectangular region designated as the zooming target and the rectangular region where the image at the final zoom ratio is to be displayed. For this reason, the drawing region never become larger than the display frame 31, and the image can be prevented from protruding from the display frame 31.

In the image zooming apparatus shown in FIG. 7, the program for realizing the function of the present invention is stored in the ROM 55 in advance. However, this program may be supplied from an external device to the image zooming apparatus of this embodiment. In this case, a means for supplying the program, e.g., a storage medium storing the program is included in the present invention. As the storage medium storing the program, a ROM, a floppy disk, an optical disk, a magnetooptical disk, a CD-ROM, a magnetic tape, or a nonvolatile memory card can be used in addition to the ROM 55.

In this specification, before and after zoom-in processing, or before and after zoom-out processing, the rectangular regions have similar shapes. However, the present invention is not limited to this. The present invention can also be applied when the aspect ratio of the rectangular region changes before and after zoom-in processing. More specifically, this function can be realized by changing the aspect ratio of the interpolation ratio when the positions of four corners are interpolated in generation of the rectangular regions at different zoom ratios. The image region is not limited to a rectangular region, and may have a circular or any other polygonal shape.

As described above, according to the image zooming apparatus of the second embodiment, when an image is to be zoomed, an image at a zoom ratio between the current zoom ratio and the final zoom ratio is generated from the image in the region as a zooming target and displayed. This processing is repeatedly performed while changing the zoom ratio stepwise until it reaches the final zoom ratio. With this processing, the process of gradually zooming the image to the final zoomed image is displayed. After zooming is instructed on the image until the zooming processing is complete, the zooming target portion can be visually confirmed, so that the zooming target portion can be clearly grasped. In addition, the user does not become anxious during processing because he/she can see the process of gradually zooming the image. For this reason, the stress of the user during the zooming processing can also be reduced.

-Third Embodiment-

In the first embodiment, to display one image data at various resolutions with a small storage capacity, only the original image file is stored, and resolution conversion processing is performed only when a request for displaying image data at a certain resolution is issued. In this method, however, resolution conversion takes a processing time, and the time after the instruction for displaying the image at a desired resolution is issued until the image is actually displayed is sometimes prolonged.

In the third embodiment to be described below, processing of displaying one image data at various resolutions as in the first embodiment can be performed at a higher speed.

Figure 9:
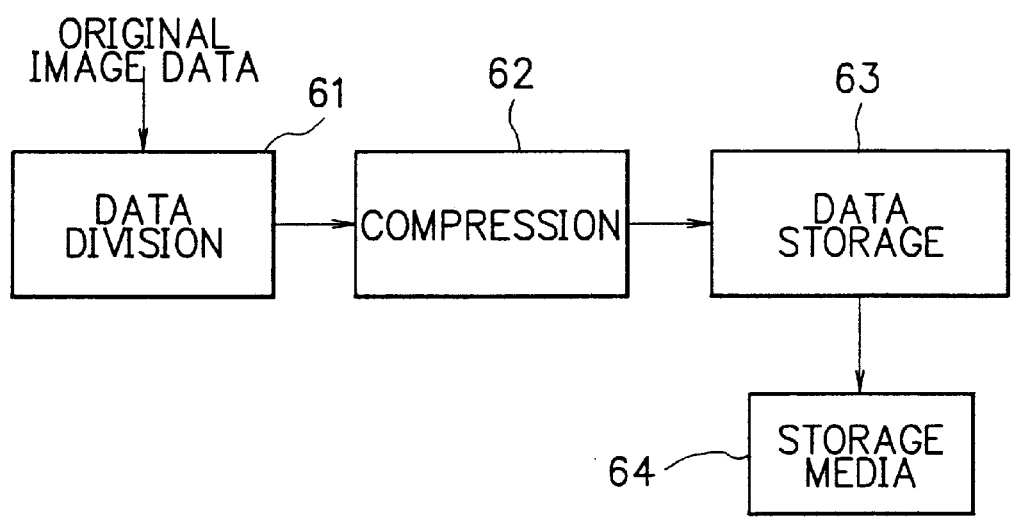
FIG. 9 is a block diagram showing the elemental characteristic feature of an image data storage apparatus according to the third embodiment of the present invention.

FIG. 9 is a block diagram showing the elemental characteristic feature of an image data storage apparatus according to the third embodiment. FIGS. 10A to 10D are views for explaining an image data storage method according to the third embodiment. The third embodiment of the present invention will be described below with reference to FIGS. 9 and 10A to 10D.

Figure 10A:
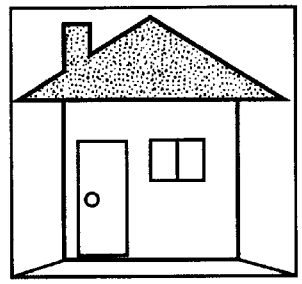
FIGS. 10A to 10D are views for explaining an image data storage method according to the third embodiment of the present invention.

Referring to FIG. 9, reference numeral 61 denotes a data division means for dividing input original image data into a plurality of resolution components. FIGS. 10A to 10D show the process of dividing the original image data. The original image data shown in FIG. 10A is divided into three resolution components shown in FIGS. 10B, 10C, and 10D by the data division means 61 shown in FIG. 9. The graphic data shown in FIG. 10A is image data (dot data).

Figure 10B:
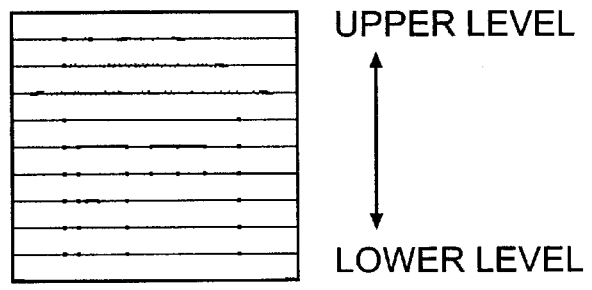
Figure 10C:
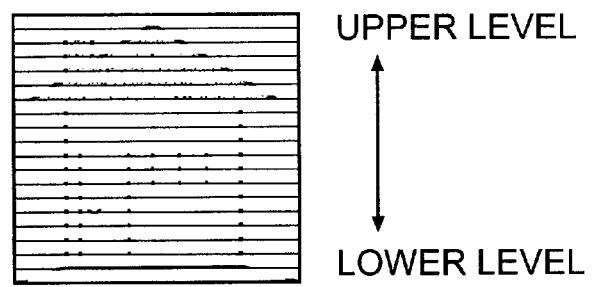
Figure 10D:
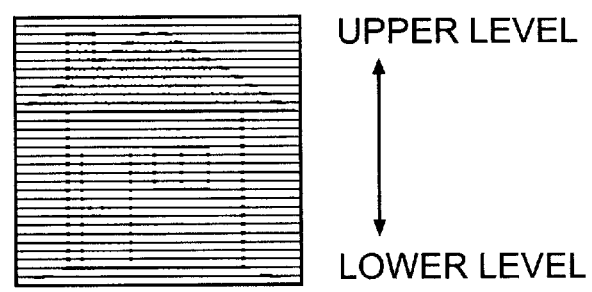

As shown in FIGS. 10A to 10D, processing of dividing the original image data into a plurality of resolution components is performed in units of scan lines. FIG. 10B shows a resolution component constituted by data on scan lines positioned at a relatively large interval among all scan lines of the original image data. FIG. 10C shows a resolution component constituted by data on scan lines positioned among the scan lines shown in FIG. 10B at a relatively small interval. FIG. 10D shows a resolution component constituted by data on scan lines positioned among the scan lines shown in FIG. 10C at the smallest interval. The resolution sequentially rises in the order of FIG. 10B, 10C, and 10D.

As is apparent from this explanation, the scan lines shown in FIGS. 10B, 10C, and 10D are different from each other, and the original image data shown in FIG. 10A is formed by the data of all these scan lines. That is, the amount of the original image data shown in FIG. 10A equals the total amount of the resolution component data shown in FIGS. 10B, 10C, and 10D.

A compression means 62 compresses the resolution component data divided by the data division means 61 in units of scan lines. Normally, image data has a large data amount and therefore is compressed and stored. This compression is often performed using identity or similarity of neighboring pixel data. Because of the nature of image data, pixel data present on one scan line have identity or similarity in many cases. Since division into resolution components in this embodiment is performed in units of scan lines, a high compression ratio can be achieved using identity or similarity of neighboring pixels by performing compression in units of scan lines.

Division of the original image data into resolution components may be performed not in units of scan lines but in units of intersections of horizontal lines and vertical lines, i.e., dots. In this case, however, pixel data having identity or similarity are often distributed to different resolution components, a high compression ratio can not be achieved. Therefore, when data compression is to be performed, division into resolution components is preferably performed in units of scan lines. When the compression means 62 is omitted, i.e., when data compression is not to be performed, division into resolution components may be performed in units of dots, as a matter of course.

A data storage means 63 rearranges the respective resolution component data which are compressed by the compression means 62 in units of scan lines such that data belonging to the same resolution component are put together, and hierarchically stores the data in the storage area of a storage medium 64. When the compression means 62 is omitted, the respective resolution component data divided by the data division means 61 are directly hierarchically stored in the storage area of the storage medium 64.

More specifically, the data storage means 63 stores the data on the scan lines shown in FIG. 10B, the data on the scan lines shown in FIG. 10C, and the data on the scan lines shown in FIG. 10D such that these data form a hierarchical structure in the storage area of the storage medium 64. At this time, the data having the lowest resolution shown in FIG. 10B is stored in the uppermost layer of the storage area of the storage medium 64, and the data having the highest resolution shown in FIG. 10D is stored in the lowermost layer.

Figure 11:
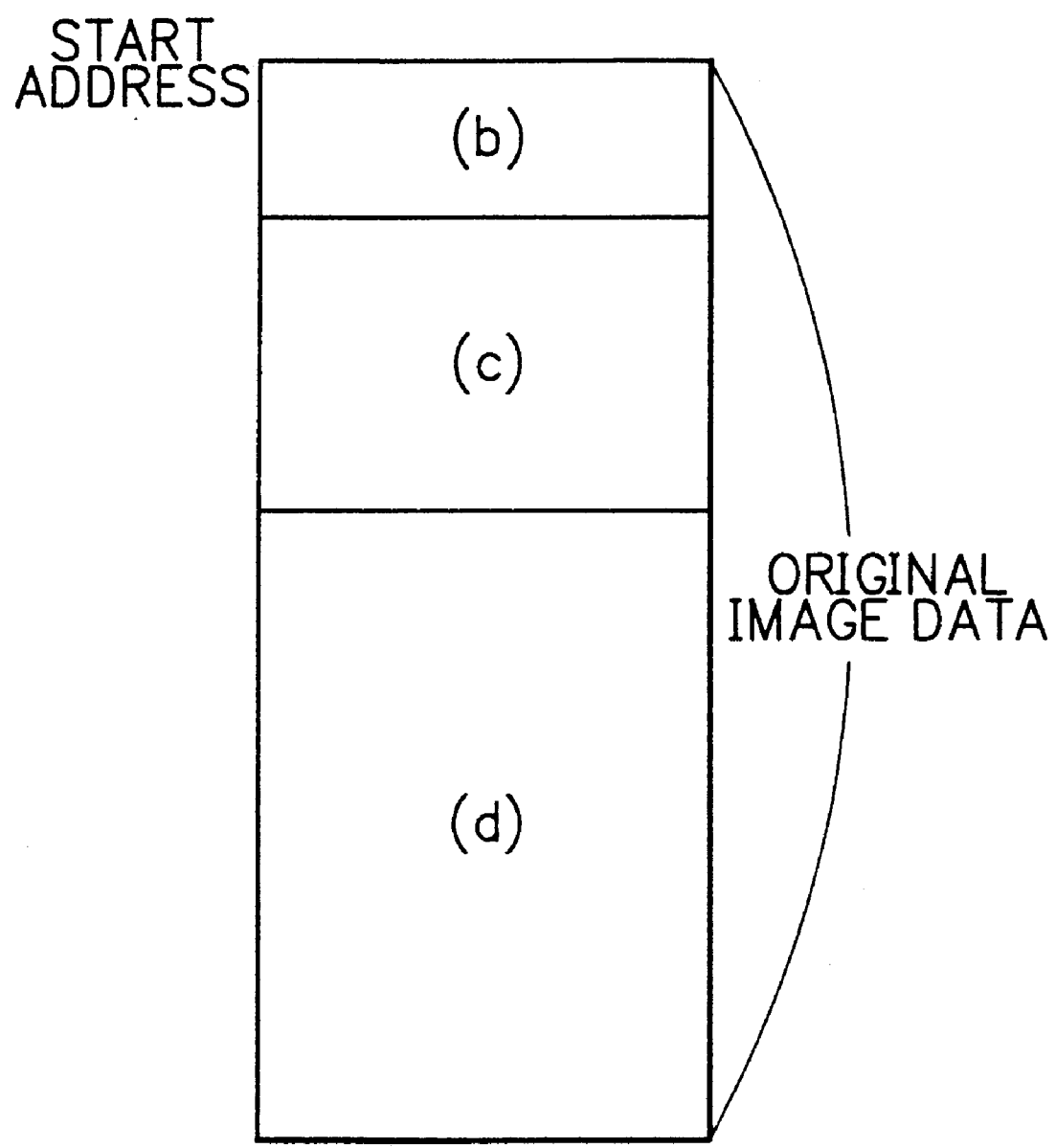
FIG. 11 is a view showing an example of storage of image data in a storage medium according to the third embodiment of the present invention.

As shown in FIG. 11, the scan line data shown in FIG. 10B is stored in a storage area (b) from the start address of the storage area of the storage medium 64, the scan line data shown in FIG. 10C is stored in the subsequent storage area (c), and the scan line data shown in FIG. 10D is stored in the subsequent storage area (d). In comparison of two resolution component data, data stored in the upper layer of the storage area will be referred to as data of upper level, and data stored in the lower layer will be referred to as data of lower level hereinafter.

When image data is to be compressed and stored, the image data need not always be divided into a plurality of resolution components and compressed, as shown in FIG. 9. For example, image data input in units of scan lines may be compressed in units of scan lines. The data may be rearranged such that data of the same resolution component are put together, and the resolution component data may be hierarchically stored in the storage area of the storage medium 64. In addition, in an image input device (not shown) for inputting the original image data, the original image data may be compressed in the hardware at a high rate.

As described above, according to the image data storage method and apparatus of this embodiment, one image data is divided into a plurality of resolution components and hierarchically stored in the storage medium 64 in advance. In reading, without performing cumbersome resolution conversion processing (when the image data storage method of this embodiment is applied to the server shown in FIG. 1, the resolution conversion section 7 can be omitted), images having various resolutions can be obtained from one image data only by controlling which resolution component data is read out. Therefore, processing of displaying one image data at various resolutions can be performed at a high speed without increasing the storage capacity of the apparatus in all.

In the above-described example, when the image having the lowest resolution is to be displayed, only the scan line data shown in FIG. 10B may be read out from the start address of the storage medium 64 and supplied to a display device (not shown). When an image having a higher, i.e., intermediate resolution is to be displayed, only the scan line data shown in FIG. 10B or 10C may be read out from the start address of the storage medium 64 and supplied to the display device (not shown). When the original image having the original resolution is to be displayed, all the scan line data shown in FIGS. 10B, 10C, and 10D may be read out from the start address of the storage medium 64 and supplied to the display device (not shown).

A low-resolution image is more frequently used than a high-resolution image as can be seen from a case wherein low-resolution reduced image information corresponding to original image data is displayed as an icon for searching for an image, and thereafter, the requested image is enlarged and displayed, a case wherein, in an operation in the design industry or the like, coarse images for layout are displayed, the arrangement of the images is confirmed, and then a detailed operation is performed for the images displayed at the original resolution, or a case wherein, in the medical industry, an entire X-ray image is displayed to confirm the presence/absence of a morbid portion, and then, the morbid portion is enlarged and displayed.

In this embodiment, lower-resolution data is stored in the upper layer (area with a smaller address number) of the storage area of the storage medium 64, and higher-resolution data is stored in the lower layer (area with a larger address number). Therefore, data which is frequently used is stored in an area with a smaller address number, so that the resolution component data can be more smoothly read out.

In the embodiment shown in FIG. 9, the respective resolution component data are hierarchically stored on one storage medium 64, as shown in FIG. 11. However, the resolution component data may be shared to be stored on a plurality of storage media. Even when all the resolution component data cannot be stored in a storage medium which allows high-speed access because of the limited data capacity, high-resolution component data whose amount is large and use frequency is low can be stored in a large-capacity storage medium, and low-resolution component data whose amount is small and use frequency is high can be stored in a storage medium allowing high-speed access. With this arrangement, the rate for reading out at least low-resolution image data having a high use frequency can be increased, and display processing can be performed at a higher speed.

In this embodiment, data can be read out in units of scan lines. For this reason, when an arbitrary image data portion is to be extracted and displayed to enlarge a detail of image data, only corresponding scan line data may be read out and developed on the memory in the extraction processing, so the entire image data need not be developed. Therefore, not only processing of displaying one image data at various resolutions but also processing of enlarging an arbitrary portion in the entire image data and displaying the partial data at the original precision can be performed at a higher speed without increasing the storage capacity of the apparatus.

Figure 12:
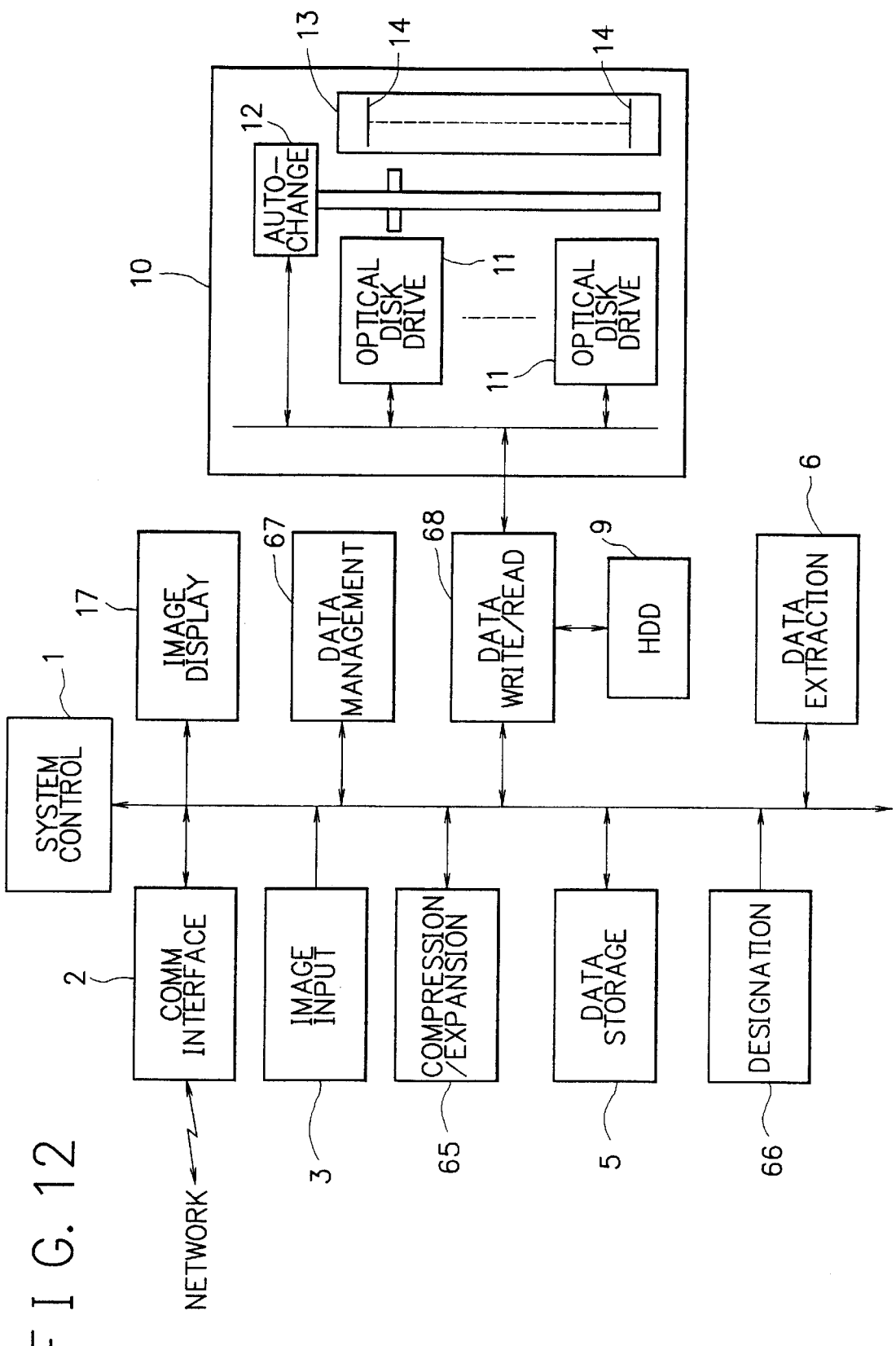
FIG. 12 is a block diagram showing the arrangement of an image data writing/reading system according to the third embodiment.

The above-described image data storage method and apparatus may be applied to a network system as shown in FIGS. 1 and 2, or a stand-alone terminal or system. FIG. 12 is a block diagram showing the arrangement of a stand-alone image data writing/reading system to which the image data storage method and apparatus according to the above-described third embodiment are applied.

As shown in FIG. 12, the image data writing/reading system of this embodiment comprises a system control section 1, a communication interface 2, an image input section 3, a compression/expansion section 65, a data storage section 5, a designation section 66, an image display section 17, a data management section 67, a data write/read section 68, a hard disk (HDD) 9, a data extraction section 6, and a disk library unit (jukebox) 10. The same reference numerals as in FIGS. 1 and 2 denote the same blocks in FIG. 12.

The jukebox 10 comprises a magazine 13 for storing a plurality of magnetooptical disks (MOs) 14, a plurality of optical disk drives 11, and an auto-change mechanism 12.

The optical disk drives 11 perform image data read/write processing for the MOs 14 stored in the magazine 13. One image data is divided into a plurality of resolution components and hierarchically written in the MO 14 under the control of the data write/read section 68. Data read processing is performed in units of resolution components or scan lines.

The auto-change mechanism 12 exchanges the MOs 14 under the control of the data write/read section 68. More specifically, the auto-change mechanism 12 extracts the MO 14 designated by the data write/read section 68 from the magazine 13 and loads the MO 14 in the corresponding optical disk drive 11, or stores, in the magazine 13, the MO 14 loaded in the optical disk drive 11 and designated by the data write/read section 68.

In the jukebox 10 having this arrangement, disks are exchanged in accordance with an instruction from the user, and corresponding image data is read out in units of resolution components or scan lines through the data write/read section 68. The readout image data is temporarily held in the data storage section 5.

The system control section 1 controls the entire system. The program therefor is stored in the HDD 9. The communication interface 16 performs communication of image data or a command with an external device (not shown) through the network. The image input section 3 inputs image data to be stored in the jukebox 10 or the HDD 9. An image input device such as an image scanner or a video camera using, e.g., a CCD is used as the image input section 3.

The compression/expansion section 65 compresses image data input by the image input section 3 in units of scan lines or expands image data read out from the HDD 9 or the jukebox 10 in units of scan lines. The data storage section 5 temporarily stores image data compressed by the compression/expansion section 65 or image data read out from the HDD 9 or the jukebox 10 through the data write/read section 68.

The image data stored in the data storage section 5 is used for data rearrangement by the data write/read section 68, expansion processing by the compression/expansion section 65, or extraction processing by the data extraction section 6. That is, the data storage section 5 functions as a work memory for processing by the data write/read section 68, the compression/expansion section 65, or the data extraction section 6.

The designation section 66 designates the image display section 17 to display an image at a desired resolution or designates an arbitrary partial region in entire image data displayed on the image display section 17 as a region to be enlarged on the full screen and displayed at the original precision (the designation section 66 consists of the extraction region designation section 19 and the resolution designation section 20 shown in FIG. 2). The designation section 66 is constituted by an input device such as a keyboard or a mouse.

The image display section 17 displays image data read out from the HDD 9 or the jukebox 10. A display device such as a CRT, an LCD, or a plasma display is used as the image display section 17. The data management section 67 manages the storage positions of the resolution component data stored in the HDD 9 or the jukebox 10 and has an address table (to be described later).

The data write/read section 68 performs image data write/read processing for the HDD 9 or the jukebox 10. The operation of the data write/read section 68 will be described later in detail. The HDD 9 stores not only the program for controlling the entire system in the system control section 1 but also certain resolution component data under the control of the data write/read section 68.

The data extraction section 6 extracts image data in a partial region designated by the designation section 66 from predetermined scan line data read out from the jukebox 10 and stored in the data storage section 5. The image data in the extracted partial region is supplied to the image display section 17 or supplied to the communication interface 2 and then transferred to an external device through the network.

The operation of the image data writing/reading system of this embodiment having the above arrangement will be described next. The operation of storing image data will be described first.

Image data input by the image input section 3 is supplied to the compression/expansion section 65 and compressed in units of scan lines. The respective scan line data which have undergone compression processing are temporarily stored in the data storage section 5.

The image data stored in the data storage section 5 is written in the HDD 9 or the jukebox 10 through the data write/read section 68. The data write/read section 68 divides the data compressed by the compression/expansion section 65 in units of scan lines into a plurality of resolution components, rearranges the data such that data belonging to the same resolution component are put together, and hierarchically stores the data in the storage area of the HDD 9 or the MO 14 (FIGS. 10 and 11).

At this time, high-resolution component data whose amount is large and use frequency is low is stored in the jukebox 10 (MO 14) having a large capacity, and low-solution component data whose amount is small and use frequency is high is stored in the HDD 9 which allows high-speed access. A cache memory may be incorporated in the data write/read section 68, and data having the highest use frequency may be stored in the cache memory. With this arrangement, at least a resolution component having a high use frequency in an image data can be read out at a high rate.

An operation of reading out image data will be described next.

When the designation section 66 is used to designate to display an image at a certain resolution, this instruction is transmitted as a request signal to the system control section 1. The system control section 1 interprets the received request signal and controls the data write/read section 68 in accordance with the interpretation result.

The data write/read section 68 reads out only resolution component data necessary for displaying the image at the requested resolution from the HDD 9 or the jukebox 10. When the image is to be displayed at a low resolution, corresponding resolution component data is read out from the HDD 9. When the image is to be displayed at a high resolution, corresponding resolution component data is read out from both the HDD 9 and the jukebox 10. The readout resolution component data is temporarily stored in the data storage section 5 and expanded by the compression/expansion section 65 in units of scan lines. Thereafter, the data is supplied to the image display section 17 and displayed at the designated resolution.

When compression processing is not performed, the storage position of each resolution component data can be easily known in reading out the resolution component data because the scan line data has a fixed length. However, when compression processing is performed, as in this embodiment, the scan line data has a variable length. Therefore, address management must be performed to know the storage position of each resolution component data.

Figure 13:
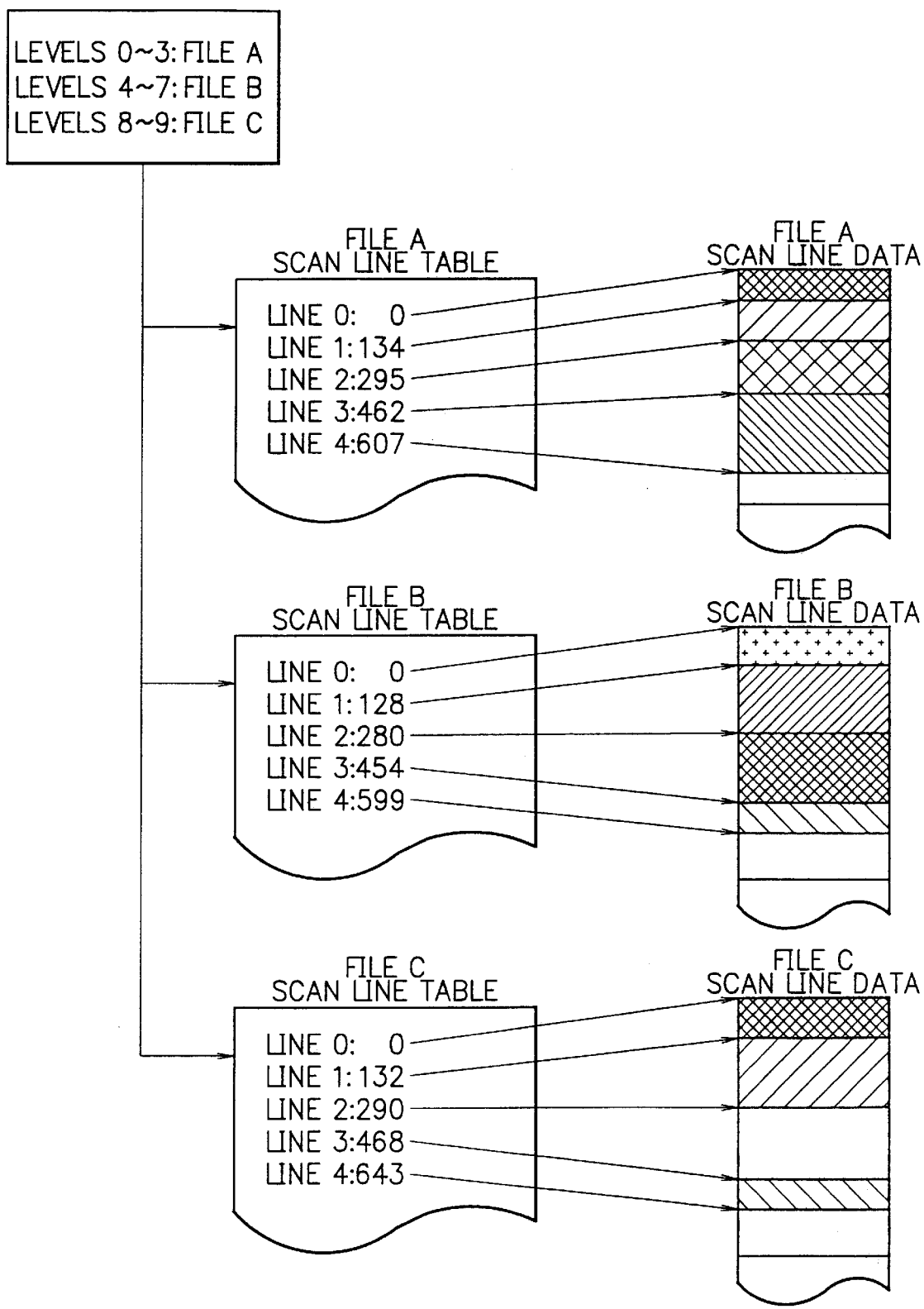
FIG. 13 is a view showing an example of an address table (scan line table) managed by a data management section shown in FIG. 12.

When the data write/read section 68 is to store the resolution component data in the HDD 9 or the jukebox 10, the data management section 67 prepares an address table as shown in FIG. 13 and manages addresses.

In the example shown in FIG. 13, one original image data is divided into resolution components of 10 steps, i.e., levels 0 to 9. Data having a smaller level number is data-of an upper level (low-resolution component data).

In this case, resolution component data corresponding to levels 0 to 3 are stored as a file A, resolution component data corresponding to levels 4 to 7 are stored as a file B, and resolution component data corresponding to levels 8 and 9 are stored as a file C. The file A can be stored in a cache memory (not shown) which is incorporated in the data write/read section 68 and allows high-speed access, the file B can be stored in the HDD 9 allowing access at a relatively high speed, and the file C can be stored in the jukebox 10 having a large capacity.

The data management section 67 prepares the address table (scan line table) for each file and manages addresses at which the scan line data are stored. The data write/read section 68 can easily read out only necessary resolution component data by referring to the address table managed by the data management section 67.

As described above, in the third embodiment, when a request for displaying an image at a certain resolution is issued, the image having the desired resolution can be easily displayed only by reading out resolution component data necessary for satisfying the request. With this arrangement, image data having various resolutions need not be independently prepared and stored. In addition, when a request is issued, processing for coping with images having various resolutions can be performed without performing cumbersome resolution conversion processing. Therefore, processing of displaying an image at various resolutions in accordance with a request can be performed at a high speed without increasing the storage capacity of the apparatus.

In this embodiment, by changing the storage medium for each resolution component, the rate for reading out at least low-resolution component data having a high use frequency can be increased. Additionally, in this embodiment, by adding a prefetch function as will be described below to the data write/read section 68, the read rate of high-resolution component data stored in the jukebox 10 can also be substantially increased. According to this arrangement, processing of displaying an image at various resolutions in accordance with a request can be performed at a higher speed.

FIG. 14 is a view for explaining the prefetch function. In the example shown in FIG. 14, the HDD 9 is used. Instead, a cache memory (not shown) incorporated in the data write/read section 68 may be used.

As shown in FIG. 14, when a read request (read 1 request) for reading out an image file storing low-solution component data is issued first, the MO 14 is accessed to read out the image file. The image file is copied into the HDD 9 (or the cache memory), and at the same time, temporarily stored in the data storage section 5, thereby ending the image file read processing. At this time, on the basis of a predetermined rule, another image file (e.g., high-resolution component data) predicted from the read-requested image file is prefetched to the HDD 9.

Assume that, thereafter, a read request (read 2 request) for reading out the image file prefetched to the HDD 9 is actually issued. Although this read request has been issued for the first time, the image file can be read out not from the MO 14 but from the HDD 9 because it has already been copied into the HDD 9. The image file for which the first read request has been issued is held in the HDD 9 in accordance with the normal cache operation and can be read out from the HDD 9 even in response to a subsequent read request.

As described above, in this embodiment, an image file which is likely to be read out next to a certain image file is copied from the jukebox 10 into the HDD 9 or the cache memory (not shown) before an actual read request is issued. Therefore, even in response to a read request issued for the first time, the image file can be read out from the HDD 9 or the cache memory, so that the time for processing of reading out an image file stored in the jukebox 10 can be substantially shortened.

Especially, in this embodiment, higher-resolution component data is prefetched in reading low-resolution component data. This processing can be effectively performed in case wherein low-resolution reduced image information corresponding to original image data is displayed as an icon for searching for an image, and thereafter, a requested image is enlarged and a case wherein, in an operation in the design industry or the like, coarse images for layout are displayed, the arrangement of the images is confirmed, and then a detailed operation is performed for the images displayed at the original resolution, or in case wherein, in the medical industry, an entire X-ray image is displayed to confirm the presence/absence of a morbid portion, and then, the morbid portion is enlarged and displayed.

FIG. 15 is a view showing examples of such a rule for realizing the prefetch function. Of the four examples shown in FIG. 15, the first to third examples are rules defining replacement of file names, and the fourth example is a rule defining replacement of part of a file.

More specifically, in the first example, when a request is issued to read out an image file whose file name has an extension "gif", an image file having the same file name and an extension "tif" is prefetched. In the second example, an image file having the same file name and extension and stored in another directory is prefetched.

In the third example, when a request for reading out an image file having a file name $A_n$ is issued, an image file having the same extension and a file name $A_{n+1}$ is prefetched. In the fourth example, when a read request is issued to read out data of xth to yth bytes in an image file having an extension dat0, data of (ax+b)th to (cy+d)th bytes (a to d are predetermined coefficients) in an image file having the same file name and an extension dat1 is prefetched.

Particularly, in this embodiment, one original image data is divided into a plurality of resolution components in units of scan lines, and the respective scan line data are rearranged such that data belonging to the same resolution component are put together, and stored in the HDD 9 or the jukebox 10. Therefore, as in the fourth example, a rule for prefetching only partial data in a file is effectively used.

The read operation of the data write/read section 68 having the prefetch function will be described below.

When a request for reading out certain image data (resolution component data) is issued, the data write/read section 68 determines whether the requested image data is stored in the HDD 9.

If it is determined that the image data is not stored in the HDD 9, corresponding image data is read out from the MO 14 in the jukebox 10 and temporarily stored in the data storage section 5, and at the same time, developed in the cache area of the HDD 9. If there is another image data associated with the readout image data in accordance with a rule held in the data write/read section 68, this another image data is also read out from the jukebox 10 and prefetched to the cache area of the HDD 9.

If the data write/read section 68 determines that the read-requested image data is stored in the HDD 9, the data is read out from the HDD 9 and supplied to the data storage section 5. Even when the read request has been issued for the first time, not the jukebox 10 but the HDD 9 can be accessed to read out the corresponding image data as long as it has already been prefetched in the above-described way. Therefore, disk exchange is unnecessary, and the read time can be largely shortened.

An operation of enlarging a detail of image data and displaying the partial data at the original precision will be described next.

While certain image data is being displayed on the image display section 17, a partial region where a detail is to be enlarged is designated by the designation section 66. This is transmitted as a request signal to the system control section 1. The system control section 1 interprets the received request signal and controls the data write/read section 68 and the data extraction section 6 in accordance with the interpretation result.

The data write/read section 68 refers to the scan line table managed by the data management section 67 and reads out only scan line data including the partial region designated by the designation section 66 from the HDD 9 or the jukebox 10. The readout scan line data are temporarily stored in the data storage section 5.

The data extraction section 6 extracts data in the partial region designated by the designation section 66 from the scan line data stored in the data storage section 5. The extracted data is expanded by the compression/expansion section 65, supplied to the image display section 17, and displayed.

As described above, in this embodiment, only corresponding scan line data need be read out and developed on the data storage section 5 in processing of extracting the designated partial region, so the entire image data need not be developed. Therefore, the storage capacity of the data storage section 5 may be relatively small, and accordingly, the time for processing of loading the image data in the data storage section 5 can be shortened. Therefore, processing of enlarging an arbitrary portion in entire image data and displaying the partial data at the original precision can be performed at a high speed without increasing the storage capacity of the apparatus.

In the embodiment shown in FIG. 12, the stand-alone computer system has been described. However, this embodiment can also be applied to a network system in which an image file storage device (server) and an access device (client) are connected through a network, as shown in FIGS. 1 and 2, as described above. In such a network system, e.g., the designation section 66 and the image display section 17 are arranged on the client side, and the remaining sections are arranged on the server side.

In the system of this type, when the network connecting the server to the client is thin, a long time is required to transfer image data. According to this embodiment, when an image is to be displayed at various resolutions, only corresponding resolution component data is transferred from the server to the client. When a partial region of image data is to be enlarged, only data in the partial region is extracted and transferred. For this reason, the transfer data amount can be made smaller than that in transfer of entire image data, so that the time required for transfer can be greatly shortened.

In the embodiment shown in FIG. 12, the jukebox 10 has been shown as an image file storage device. However, the present invention is not limited to this and can be applied to any storage unit whose data read time is longer than that of a high-speed secondary storage unit such as the HDD 9 or the cache memory (not shown).

As described above in detail, according to the third embodiment, the scan line data constituting the original image are rearranged such that data belonging to the same resolution component are put together, and the respective resolution component data are hierarchically stored in the storage area of the storage medium. One original image data is divided into a plurality of resolution components in advance, and the respective resolution component data are hierarchically stored in the storage medium. With this arrangement, images having various resolutions can be easily obtained from one original image data without preparing and storing image data having various resolutions or performing cumbersome resolution conversion processing. Therefore, processing of displaying one image data at various resolutions can be performed at a high speed without increasing the storage capacity of the apparatus in all.

Since the hierarchical structure of resolution components of the original image data is formed in units of scan lines, data compression processing can be performed in units of scan lines, so that a high compression ratio can be achieved using the identity or similarity of pixel data present on the scan lines. Data read processing can also be performed in units of scan lines. When an arbitrary portion in image data is to be extracted and displayed, only corresponding scan line data need be read out and developed on the memory, so the entire image data need not be developed. Therefore, processing of enlarging an arbitrary portion in the entire image data can also be performed at a high speed without increasing the storage capacity.

Lower-resolution component data is stored in the upper layer of the storage area of the storage medium, and higher-resolution component data is stored in the lower layer. Since data having a higher use frequency can be stored in a storage area having a smaller address number, resolution component data read processing can be more smoothly performed. Therefore, processing of displaying one image data at various resolutions can be performed at a higher speed.

The plurality of resolution component data are stored in a plurality of storage media. For example, high-resolution component data whose amount is large and use frequency is low can be stored in a large-capacity storage medium having a low read rate, and low-resolution component data whose amount is small and use frequency is high can be stored in a storage medium which allows high-speed read access. With this arrangement, for at least data having a high use frequency, the read rate can be increased, and a low-resolution image can be displayed at a higher speed.

The prefetch means is arranged to develop data associated with read-requested data in accordance with a predetermined rule as data which is likely to be read out next to the requested data from a low-speed storage medium to a high-speed storage medium in advance. With this arrangement, even when a request for reading out certain data is actually issued for the first time, corresponding data can be read out from the high-speed storage medium on which the data has been developed at the time reading out the preceding data. Not only for low-resolution component data having a high use frequency but also for high-resolution component data having a relatively low use frequency, the read rate can be increased. Therefore, each image from a low-resolution image to a high-resolution image can be displayed at a higher speed.

-Fourth Embodiment-

In the third embodiment, the image prefetch function is added to the data write/read section 68 and used in reading image data stored in the disk library unit such as the jukebox 10. However, the problem that a long time is required to read out image data still arises even in the use of the disk library unit. This problem is also posed when the read target is data other than image data.

More specifically, in general, when a large-capacity external storage medium having a low access speed (e.g., a secondary storage unit such as a magnetic tape unit, a magnetic disk unit, or a floppy disk) is to be accessed to read out data stored in the medium, read processing takes a long time.

Although a large quantity of data must be stored in the large-capacity secondary storage unit, data read processing is preferably performed in a time as short as possible. The increase in read rate is required not only for application programs of the future but also for currently commercially available application programs. The fourth embodiment to be described below copes with this requirement.

Figure 18:
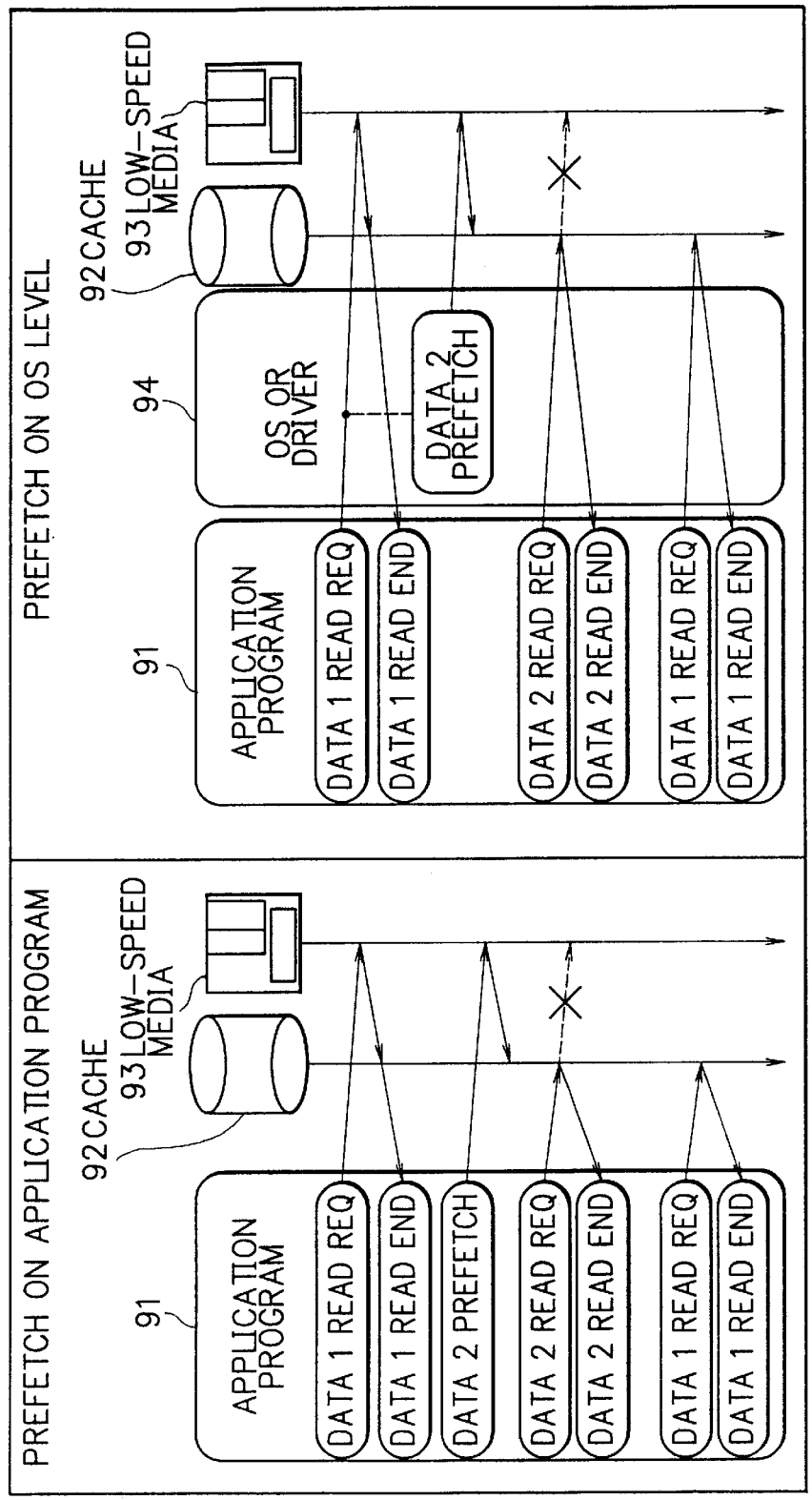
FIG. 18 is a view for explaining the data reading method according to the fourth embodiment of the present invention in more detail.
Figure 19A:
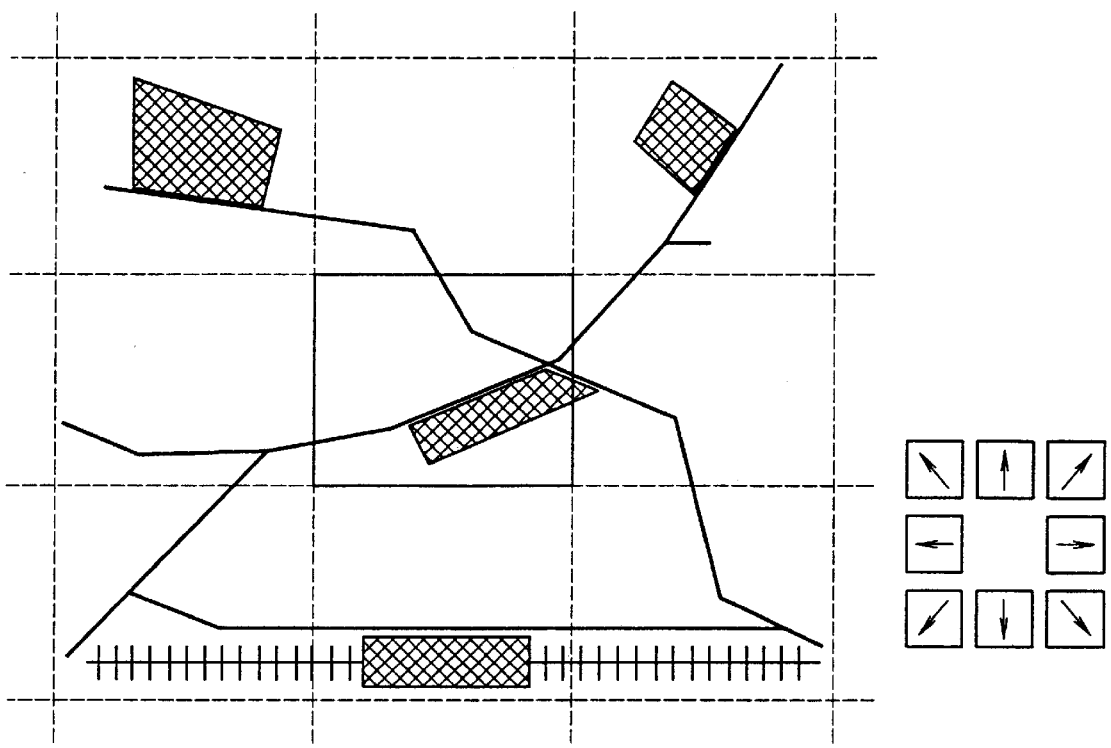
FIGS. 19A and 19B are views showing application examples of the data reading method according to the fourth embodiment of the present invention.
Figure 19B:
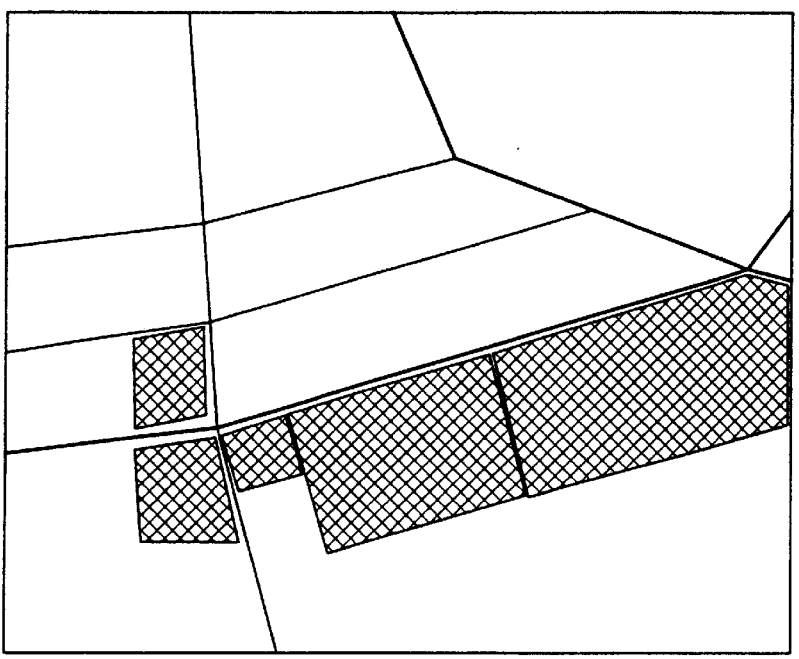

In the fourth embodiment, the data read operation with the prefetch function and the rule used for prefetch processing are the same as those shown in FIGS. 14 and 15. FIG. 16 is a view showing a system for realizing the data reading method of this embodiment. FIG. 17 is a block diagram showing the functional arrangement of a prefetch driver shown in FIG. 16. FIG. 18 is a view for explaining the data reading method of this embodiment in more detail. FIGS. 19A and 19B are views showing an application example of the data reading method of this embodiment.

The fourth embodiment will be described below with reference to FIGS. 14 to 19B. Before the description, the normal operation of a read cache which is conventionally generally used to speed up data read processing will be described on the basis of FIGS. 20 and 21. Down arrows in FIG. 20 indicate the lapse of a time t.

Figure 20:
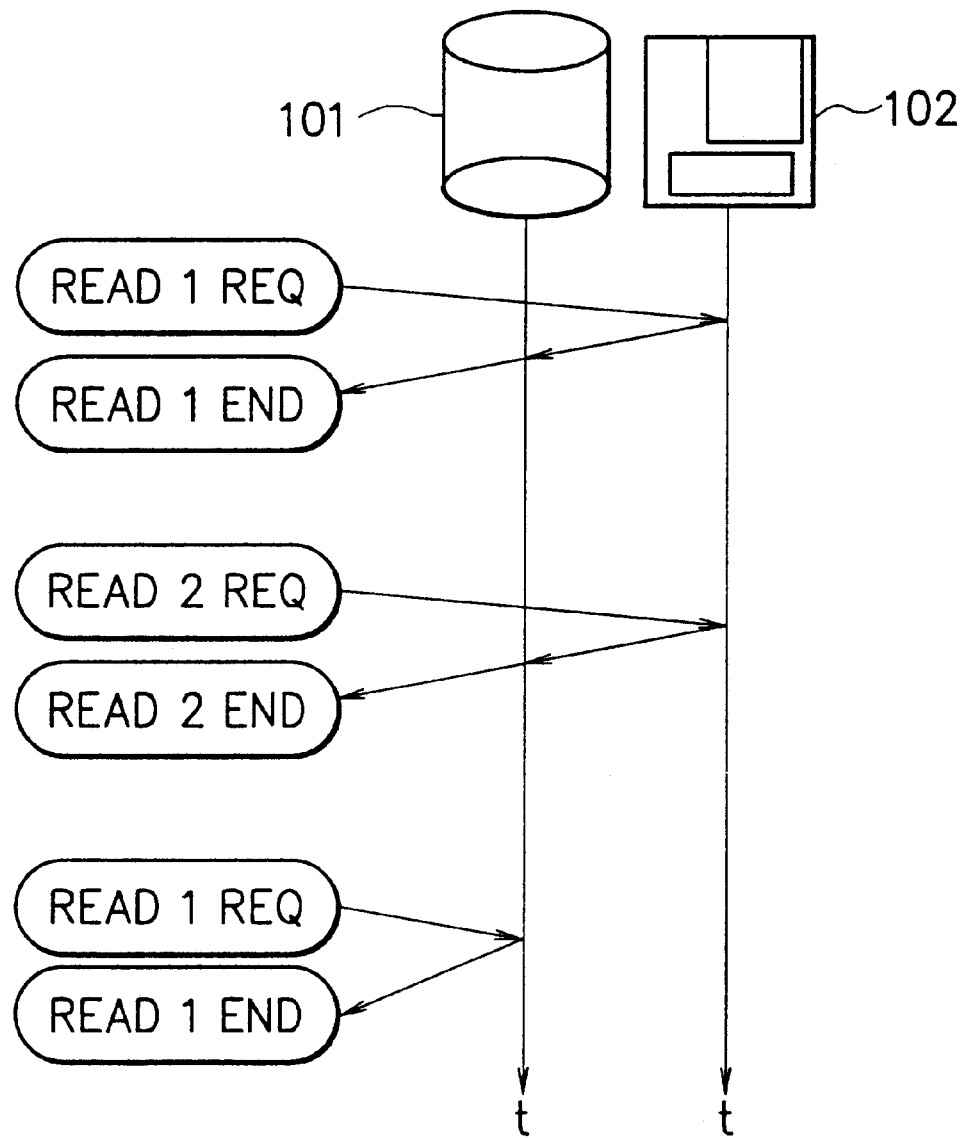
FIG. 20 is a view for explaining a normal cache operation.

Referring to FIG. 20, reference numeral 101 denotes a cache memory; and 102, a magnetooptical disk (MO). The cache memory 101 may be formed using a semiconductor memory such as a DRAM or an SRAM. When the amount of data to be stored is large, part of the storage area of, e.g., a large-capacity hard disk which allows high-speed access is used.

The MO 102 is one of a plurality of disks of, e.g., a disk library unit and stores, e.g., an image file having a large quantity of data. An appropriate MO 102 is selected by the auto-change mechanism, and an image file is read out from the MO 102. Disks are exchanged in this way, and a long time is required to read out data.

Figure 21:
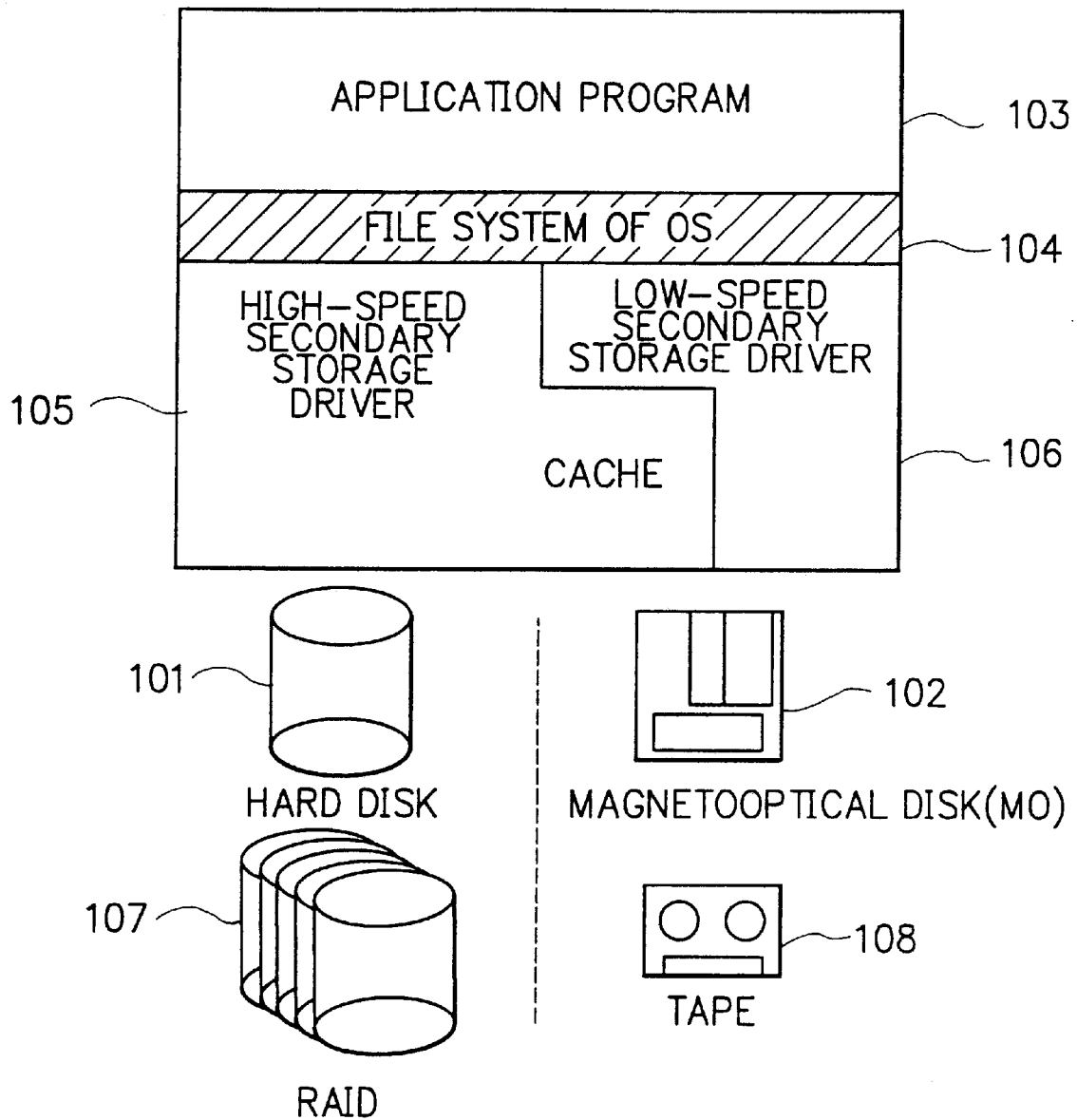
FIG. 21 is a view showing the normal arrangement of a computer system.

As shown in FIG. 21, in a computer such as a personal computer, an application program 103 normally runs on an operating system (OS), and an image file is read out through the OS. More specifically, in reading an image file, the application program 103 accesses the OS, and a file system 104 of the OS drives a driver for the storage unit, thereby reading out the image file.

The storage unit has a high-speed secondary storage driver 105 and a low-speed secondary storage driver (also called a tertiary storage driver) 106. The high-speed secondary storage driver 105 is used to read/write data from/in the hard disk 101 or a RAID (Redundant Array of Inexpensive Disks: a disk array unit using a plurality of small hard disks) 107 which allow high-speed access. The low-speed secondary storage driver 106 is used to read/write data in/from the MO 102 or a tape 108 which cannot be accessed at a high speed.

The low-speed secondary storage driver 106 performs processing of directly accessing the MO 102 or the tape 108, reading out an image file, and returning the image file to the application program 103 through the file system 104 of the OS, and at the same time, performs processing to copy the readout image file into the cache memory (as described above, part of the storage area of the hard disk 101 is used as the cache memory).

With this processing, it is checked by the file system 104 of the OS whether the requested image file is stored in the cache memory. If the image file is stored in the cache memory, the image file is read out from the cache memory and transferred to the application program 103. If the requested image file is not present in the cache memory, the image file is read out from the MO 102 or the tape 108 and transferred to the application program 103, and at the same time, the readout image file is copied into the cache memory.

Therefore, as shown in FIG. 20, when a request is issued for the first time to read out certain image file 1, the MO 102 is accessed to read out image file 1 because image file 1 has not been held in the cache memory 101 yet. Image file 1 is copied into the cache memory 101 and simultaneously transferred to an application program (not shown), thereby ending the processing of reading out image file 1.

Assume that a read request for reading out image file 2, different from image file 1 which has been read out first, is issued next. In this case as well, since image file 2 has not been held in the cache memory 101 yet, image file 2 is read out from the MO 102 and copied into the cache memory 101. At the same time, image file 2 is transferred to the application program (not shown), thereby ending the processing of reading out image file 2.

Assume that, thereafter, a read request for reading out image file 1 that has been read out first is issued. At this time, image file 1 is held in the cache memory 101. Image file 1 is read out from the cache memory 101 and transferred to the application program (not shown), thereby ending the read processing. With this arrangement, image file 1 can be read out from the cache memory 101 at a higher speed than that of direct access to the MO 102.

However, in the normal read cache memory operation, an image file can be read out from the cache memory 101 only when the second or subsequent request for reading out the same image file is issued. Therefore, in response to the first read request, the MO 102 must be directly accessed, and this still requires a long read processing time.

In this embodiment, however, as described above, when a request for reading out a certain image file is issued, another image file which is likely to be read out next is also copied into the cache memory in advance, together with the readout image file. This operation is performed on the basis of a rule which has been determined in advance as a read rule. This operation unique to this embodiment will be referred to as "rule-based prefetch" hereinafter.

As shown in FIG. 14, when a read request for reading out image file 1 is issued for the first time, the MO 14 is directly accessed to read out image file 1. Image file 1 is copied into a cache memory 9 (e.g., part of the storage area of the hard disk) and simultaneously transferred to an application program (not shown), thereby ending processing of reading out image file 1. At this time, image file 2 predicted from image file 1 on the basis of a predetermined rule is also prefetched into the cache memory 9.

Assume that a read request for reading out image file 2 different from image file 1 which has been read out first is issued next. Although this read request has been issued for the first time, image file 2 can also be read out from the cache memory 9 because it has already been copied in the cache memory 9 in the preceding processing of reading out image file 1. Since image file 1 is held in the cache memory 9 in accordance with the normal cache operation, image file 1 can be read out from the cache memory 9 in response to a subsequent read request.

As described above, according to this embodiment, an image file which is likely to be read out next to a certain image file is copied into the cache memory in advance before an actual read request is issued. Therefore, even in response to a read request issued for the first time, the cache memory can be accessed to read out the image file, so the image file read processing time can be substantially shortened.

When the prefetch operation is to be performed, the relationship between the requested image file and an image file to be prefetched in correspondence with the requested image file is very important. Therefore, when the above-described prefetch function is to be arranged, the prefetch function is normally practiced at the application program level more specifically, when an application program is to be prepared, the prefetch function necessary for the application program is generally incorporated in the application program itself.

However, the prefetch function cannot be incorporated in an existing application program, or even if it is possible, a certain work is required. In this embodiment, a system for performing the prefetch operation on the level of the operating system as the base of the operation of an application program is introduced. With this arrangement, the prefetch function as an additional function can be readily optionally incorporated.

FIG. 15 shows examples of a rule for performing the prefetch operation on the OS level. More specifically, all the rules are defined using the file name handled at the OS level as a reference, so that the prefetch operation is performed at the OS level.

The number of image files to be prefetched is not limited to one, and two or more image files may be simultaneously prefetched. More specifically, all image files which satisfy the above-described rule may be simultaneously prefetched. Alternatively, a rule for prefetching two or more image files in correspondence with one image file may be defined.

The rule need not always be defined using the file name as a reference. As far as prefetch processing can be performed on the OS level, the rule may be defined using another item as a reference.

The following operations can be realized using such a rule. For example, when a request for reading out an image file storing icons for searching for files is issued, an image file storing the original image can be prefetched as a file which is likely to be read out next. When a request for reading out an image file storing reduced image data for reducing the entire image to the size of a part (e.g., a window) of the display screen is issued, an image file storing image data for enlarging the image data to the full size of the display screen can be prefetched.

As shown in FIG. 19A, assume that a map is displayed in, e.g., a navigation system. In correspondence with an image (image in a frame indicated by a solid line at the center of FIG. 19A) which is currently being displayed, images in eight regions indicated by dotted lines around the central image can be prefetched as images which are likely to be displayed next. Alternatively, to display narrow roads and buildings, as shown in FIG. 19B, when the map image is displayed at a low information density level, as shown in FIG. 19A, a map image at a high level as shown in FIG. 19B can also be prefetched.

FIG. 16 is a view showing a system for realizing the prefetch function on the OS level. In this embodiment, a prefetch driver 73 is arranged independently of an application program 71 to perform the image file prefetch operation on the OS level.

As shown in FIG. 16, the application program 71 runs on an OS 72. When an image file is to be read out, the application program 71 accesses the OS 72. The OS 72 transmits the requested file name to a file sharing system 74 through the prefetch driver 73. At this time, the prefetch driver 73 determines, through the OS 72, a file name to be prefetched on the basis of a predetermined rule and the requested file name, and transmits the file name to the file sharing system 74.

The file sharing system 74 drives a low-speed medium driver 75, reads out the requested image file from a magnetooptical disk (MO) (not shown), and returns the image file to the application program 71 through the OS 72. The file sharing system 74 also develops the image file to be prefetched on a cache memory (not shown: e.g., a partial area of the hard disk) in advance.

The prefetch driver 73 shown in FIG. 16 has the functional arrangement as shown in FIG. 17.

Referring to FIG. 17, a rule storage section 81 stores predetermined read rules for the prefetch operation, e.g., various rules shown in FIG. 15.

When a request for reading out a certain image file is issued, a read control section 82 performs control to develop another image file associated as an image file which is likely to be read out next to the certain image file from a low-speed secondary storage unit 84 to a high-speed secondary storage unit 85 in advance.

For example, the read control section 82 determines the file name of data to be developed in advance on the basis of the rule stored in the rule storage section 81 by using the file name of the read-requested image file which is supplied from the operating system, and transmits the file name to a data read section 83 together with the requested file name.

The data read section 83 includes the file sharing system 74 and the low-speed medium driver 75 shown in FIG. 16. The data read section 83 prefetches an image file from the low-speed secondary storage unit 84 to the high-speed secondary storage unit 85 under the control of the read control section 82, or reads out an image file from the low-speed secondary storage unit 84 or the high-speed secondary storage unit 85. When an image file is to be read out from the low-speed secondary storage unit 84, the readout image file is copied into the high-speed secondary storage unit 85, as in the normal cache operation.

More specifically, the data read section 83 operates as follows. When a request for reading out a certain image file is issued, the data read section 83 checks whether the image file is stored in the high-speed secondary storage unit (e.g., a cache memory formed in a partial area of the hard disk) 85. If the image file is present in the high-speed secondary storage unit 85, the required image file is read out from the high-speed secondary storage unit 85.

If the requested image file is not present in the high-speed secondary storage unit 85, the data read section 83 reads out the image file from the low-speed secondary storage unit 84 (e.g., a jukebox formed by a plurality of MOs). At the same time, the data read section 83 develops another image file or part of the image file associated according to the rule stored in the rule storage section 81 from the low-speed secondary storage unit 84 to the high-speed secondary storage unit 85 in advance before an actual read request is issued.

The operation of this embodiment constituted to perform the prefetch operation on the OS level will be described next in comparison to the prefetch operation implemented in the application program level. As shown in FIG. 18, in the prefetch operation on the application program level, when a request for reading out certain data 1 is issued for the first time, a low-speed medium 93 such as an MO is accessed to read out data 1, and the readout data is copied into a cache memory 92. Simultaneously, data 1 is transferred to an application program 91, thereby ending processing of reading out data 1.

The application program 91 reads out data 2 predicted from data 1 on the basis of a predetermined rule from the low-speed medium 93 and prefetches data 2 to the cache memory 92. With this arrangement, when a request of reading out data 2 is actually issued, not the low-speed medium 93 but the cache memory 92 can be accessed to read out data 2. As is apparent from the above description, the prefetch operation is performed by the application program 91 itself.

To the contrary, in this embodiment, when a request for reading out certain data 1 is issued for the first time, data 1 is read out from the low-speed medium 93 and copied into the cache memory 92, and at the same time, transferred to the cache memory 92, as in the above processing. However, data 2 is prefetched by the OS or a prefetch driver 94 upon receiving a request for reading out data 1. Therefore, according to this embodiment, the application program 91 itself does not perform the prefetch operation, so the prefetch function can be easily optionally added.

As described above in detail, according to the fourth embodiment, when a data read request is issued, another data associated as data which is likely to be read out next to the data in accordance with a predetermined rule is developed from the low-speed storage unit to the high-speed storage unit in advance. With this arrangement, even when a request for reading out certain data is actually issued for the first time, the data has already been developed from the low-speed storage unit to the high-speed storage unit in a preceding processing of reading out another data, and therefore can be read out from the high-speed storage unit. As a result, the rate for reading out data from the low-speed storage unit can be substantially increased.

In addition, the reading method of developing data in advance, as described above, is practiced at the level of the operating system applied to the computer. Therefore, an existing application program need not be modified to incorporate such a pre-developing function, and the function can be readily optionally incorporated in any application program. Consequently, the data reading method and apparatus of the present invention, which can be applied independently of the application program to be applied, can be provided.

What is claimed is:

1. A data reading method applied to a network system in which an image data storage device and an access device are connected, comprising steps of:

transmitting image data in a file from said storage device to said access device;

designating an arbitrary portion of said image data transmitted and displayed on said access device;

reading out only wanting image data in said arbitrary portion designated on said access device from the same file as said file of said image data transmitted; and transferring said wanting image data to said access device through a network.

2. A method according to claim 1, wherein only image data in a region designated as a region where the image is to be enlarged in said access device, is extracted, and the extracted image data is transferred to said access device through said network.

3. A method according to claim 1, wherein only zoomed-out image data in a region designated as a region where the image is to be reduced in said access device, is extracted, and the extracted image data is transferred to said access device through said network.

4. A data reading apparatus applied to a network system in which an image data storage device and an access device are connected, comprising:

transmitting means for transmitting image data in a file in said storage device to said access device;

interpretation means for interpreting a request signal sent from said access device to know what region in the same files as said file of said image data transmitted is requested to be read out; and image read means for reading out only wanting image data in an arbitrary portion of the image data in said same file of said file of said image data transmitted in accordance with an interpretation result from said interpretation means, wherein said transmitting means transfers only the read-out wanting image data in said arbitrary portion to said access device through a network.

5. An apparatus according to claim 4, wherein said image read means comprises:

data extraction means for extracting only image data in a region designated as a region where the image is to be enlarged in said access device in accordance with the interpretation result from said interpretation means; and transfer means for transferring the image data extracted by said data extraction means to said access device through said network.

6. An apparatus according to claim 4, wherein said image read means comprises:

data extraction means for extracting only zoomed-out image data in a region designated as a region where the image is to be reduced in said access device in accordance with the interpretation result from said interpretation means; and transfer means for transferring the image data extracted by said data extraction means to said access device through said network.

7. A network system in which an image data storage device and an access device are connected, wherein said storage device comprises:

transmitting means for transmitting image data in a file to said access device;

interpretation means for interpreting a request signal sent from said access device to know what region in said image data is requested to be read out; and image read means for reading out image data in a designated partial region from the same file as said file of said image data transmitted, in accordance with an interpretation result from said interpretation means, and transferring the read-out image data to said access device through a network, and said access device comprises:

region designation means for designating an arbitrary partial region of the whole of said image data transmitted from said storage device; and request means for transferring, as a request signal, said partial region designated by said region designation means, to said storage device through said network.

8. A system according to claim 7, wherein said access device further comprises image zooming means for, while said image read means in said storage device is reading/transferring the image data in said partial region, performing digital signal processing for image data which has already been stored in said access device, thereby sequentially displaying a plurality of steps of zoomed images generated by changing stepwise a zoom ratio using image data which is currently being displayed, and display is switched to the image data transferred by said image read means after the image is zoomed to a full size of a display screen of said access device.

9. A data reading method applied to a network system in which an image data storage device and an access device are connected, comprising steps of:

when image data stored in said storage device is read out, converting said image data into image data having a resolution corresponding to a request from said access device, and transferring the converted image data to said access device through a network.

10. A method according to claim 9, wherein the conversion of the image data includes lowering an original resolution of the image data stored in said storage device.

11. A data reading apparatus applied to a network system in which an image data storage device and an access device are connected, comprising:

interpretation means for interpreting a request signal sent from said access device to know what resolution image data stored in said storage device is requested to be displayed; and image read means for, when the image data stored in said storage device is to be read out, converting the image data into image data having a resolution corresponding to the request from said access device in accordance with an interpretation result from said interpretation means and transferring the converted image data to said access device through a network.

12. A network system in which an image data storage device and an access device are connected, wherein said access device comprises:

resolution designation means for designating a resolution to display an image at a desired resolution; and request means for transferring information designated by said resolution designation means to said storage device through a network as a request signal, and said storage device comprises:

interpretation means for interpreting the request signal sent from said access device to know what resolution image data stored in said storage device is requested to be displayed; and image read means for, when the image data stored in said storage device is to be read out, converting the image data into image data having a resolution corresponding to the request from said access device in accordance with an interpretation result from said interpretation means and transferring the converted image data to said access device through said network.

13. A network system in which an image data storage device and an access device are connected, wherein said storage device comprises:

transmitting means for transmitting image data in a file to said access device;

interpretation means for interpreting a request signal sent from said access device to know what region of the file of said image data is requested to be read out, or what resolution image data stored in said storage device is requested to be displayed; and image read means for, in accordance with an interpretation result from said interpretation means, reading out image data in a designated partial region from the same file as said file of said image data transmitted, and transferring the read-out image data to said access device through a network, or when the stored image data is read out, converting said image data into image data having a resolution corresponding to the request from said access device, and transferring the converted image data to said access device through said network, and said access device comprises:

display means for displaying said image data transmitted from said storage device;

region designation means for designating an arbitrary partial region of the whole of said image data displayed on said display means;

resolution designation means for designating a desired resolution at which said image data is to be displayed on said display means; and request means for transferring, as a request signal, information on said partial region designated by said region designation means and designation by said resolution designation means, to said storage device through said network.

14. A system according to claim 13, wherein said access device further comprises image zooming means for, while said image read means in said storage device is reading/transferring the image data in said partial region, performing digital signal processing for image data which has already been stored in said access device, thereby sequentially displaying a plurality of steps of zoomed images generated by changing stepwise a zoom ratio of an image which is currently being displayed, and display is switched to the image data transferred by said image read means after the image is zoomed to a full size of a display screen of said access device.

15. An image zooming method of zooming a displayed image by digital signal processing, comprising steps of:

repeatedly performing, in zooming an image, processing of setting a drawing region which is obtained by interpolating, at a predetermined interpolation ratio, a space between a zooming target region and a region where an image in said zooming target region is to be displayed at a final zoom ratio, and generating, using the image data in said zooming target region, an image as image data zoomed in accordance with a size of said drawing region, and displaying said image, while changing the interpolation ratio until the zoom ratio reaches the final zoom ratio.

16. An image zooming method of zooming a displayed image by digital signal processing, comprising steps of:

repeatedly performing, in zooming an image, processing of setting a drawing region which is a rectangular region having four corners obtained by interpolating at a predetermined interpolation ratio a space between four corners of a rectangular region as a zooming target and four corners of a rectangular region where an image in said rectangular region as the zooming target is to be displayed at a final zoom ratio, and generating, using the image data in said rectangular region as the zooming target, an image as image data zoomed in accordance with a size of said drawing region, and displaying said image, while changing the interpolation ratio until the zoom ratio reaches the final zoom ratio.

17. An image zooming apparatus for zooming a displayed image by digital signal processing, comprising:

region designation means for designating one of an arbitrary image region as a zoom-in target and an arbitrary image region as a zoom-out target where an image is to be reduced in a zoom-out operation;

image display means for setting a drawing region which is a rectangular region having four corners obtained by interpolating at a predetermined interpolation ratio a space between four corners of said image region designated by said region designation means and four corners of an image display frame, and generating, using one of the image data in said image region as the zoom-in target and the image data in said image display frame as the zoom-out target, an image as image data zoomed in accordance with a size of said drawing region, and displaying said image; and display control means for performing control to change stepwise the interpolation ratio used by said image display means until an image at a final zoom ratio is displayed.

18. A computer-readable recording medium storing a program comprising:

a procedure code of causing a computer to transmit image data in a file from a storage device to an access device, designate an arbitrary portion of said image data transmitted and displayed on said access device, read out only wanting data in said arbitrary portion designated on said access device from image data in the same file of said file of said image data transmitted from said storage device connected to said access device through a network, and transfer said wanting data to said access device through said network.

19. A computer-readable recording medium storing a program comprising:

a procedure code of causing a computer to designate an arbitrary portion of image data displayed on an access device, read out only the arbitrary portion designated on said access device from the same image data as said image data stored in a storage device connected to said access device through a network, and transfer the arbitrary portion to said access device through said network; and a procedure code of, while the arbitrary portion of image data is being read out/transferred, causing said computer to perform digital signal processing for image data which has already been stored in said access device, thereby sequentially displaying a plurality of steps of zoomed images generated by changing stepwise a zoom ratio using the image data which is currently being displayed, and switch display to the image data transferred from said storage device to said access device after the image is zoomed to a full size of a display screen.

20. A computer-readable recording medium storing a program comprising:

a procedure code of, when image data stored in said storage device is to be read out, causing a computer to convert said image data into image data having a resolution corresponding to a request from an access device connected to said storage device through a network and transfer the converted image data to said access device through said network.

21. A computer-readable recording medium storing a program comprising a procedure code of causing a computer to function as:

region designation means for designating one of an arbitrary image region as a zoom-in target of digital signal processing and an arbitrary image region as a zoom-out target where an image is to be reduced in a zoom-out operation, image display means for setting a drawing region which is a rectangular region having four corners obtained by interpolating at a predetermined interpolation ratio a space between four corners of said image region designated by said region designation means and four corners of an image display frame, and generating, using one of the image data in said image region as the zoom-in target and the image data in said image display frame as the zoom-out target, an image as image data zoomed in accordance with a size of said drawing region, and displaying said image, and display control means for performing control to change stepwise the interpolation ratio used by said image display means until an image at a final zoom ratio is displayed.

22. An image data storage method of storing image data in a storage medium, comprising steps of:

classifying all scan lines constituting a single unit of image data into a plurality of groups such that each of said groups contains scan lines of an equal interval, and different groups correspond to different intervals; and storing said unit of image data in said storage medium such that the data of the group of the wider interval, which corresponds to the lower resolution component, in the upper layer of the storage area of said storage medium while the data of the group of the narrower interval, which corresponds to the higher resolution component, in the lower layer of said storage area of said storage medium.

23. A method according to claim 22, wherein the data hierarchically stored in said storage area of said storage medium are the resolution component data compressed in units of scan lines.

24. A method according to claim 22, wherein a plurality of units of resolution component data divided from said image data are stored in a plurality of storage media, respectively.

25. An image data storage apparatus for storing image data in a storage medium, comprising:

data division means for dividing the data on all scan lines constituting an original image into a plurality of groups such that each of said groups contains data units on scan lines of an equal interval, different groups correspond to different intervals, and the group of the wider interval is considered to correspond to the lower resolution component data unit while the group of the narrower interval is considered to correspond to the higher resolution component data unit; and data storage means for rearranging the plurality of resolution component data units divided by said data division means such that data units belonging to the same resolution component are put together, and storing said original image in said storage medium such that the data unit of the lower resolution component is stored in the upper layer of the storage area of said storage medium while the data unit of the higher resolution component is stored in the lower layer of said storage area of said storage medium.

26. An apparatus according to claim 25, further comprising compression means for compressing, in units of scan lines, the plurality of resolution component data units divided by said data division means, and wherein said data storage means hierarchically stores the respective resolution component data units compressed in units of scan lines by said compression means in said storage area of said storage medium.

27. An image data storage apparatus according to claim 25, further comprising compression means for compressing the data of said original image in units of scan lines, wherein said data division means divides said data of all scan lines constituting the data compressed by said compression means, into said plurality of resolution component data.

28. An apparatus according to claim 25, wherein said data storage means stores the plurality of resolution component data units divided from the original image data in a plurality of storage media respectively.

29. An image data writing/reading system comprising:

data division means for dividing data on all scan lines constituting an input original image into a plurality of groups such that each of said groups contains data on scan lines of an equal interval, different groups correspond to different intervals, and the group of the wider interval is considered to correspond to the lower resolution component data unit while the group of the narrower interval is considered to correspond to the higher resolution component data unit;

data storage means for rearranging the plurality of resolution component data divided by said data units division means such that data units belonging to the same resolution component are put together, and hierarchically storing the respective resolution component data units in a storage area of said storage medium;

data read means for reading out only one of the respective resolution component data units in accordance with a request from a user, selected out of all resolution component data units constituting said original image, stored in said storage medium by said data storage means in correspondence with a request from a user; and image display means for displaying an image on the basis of the data read out by said data read means.

30. A system according to claim 29, wherein said data read means has prefetch means for, when a request for reading out data unit is issued developing in advance another data unit associated as a data unit which is likely to be read out next to the requested data unit in accordance with a predetermined rule from a storage medium whose read rate is low to a storage medium whose read rate is high.

31. A system according to claim 30, wherein said predetermined rule associates higher-resolution component data unit with a low-resolution component data unit, as data unit which is likely to be read out next to said low-resolution component data unit when a request for reading out said low-resolution component data is issued.

32. An image data writing/reading system comprising:

data division means for dividing data on all scan lines constituting an input original image into a plurality of groups such that each of said groups contains data on scan lines of an equal interval, different groups correspond to different intervals, and the group of the wider interval is considered to correspond to the lower resolution component data unit while the group of the narrower interval is considered to correspond to the higher resolution component data unit;

compression means for compressing, in units of scan lines, the plurality of resolution component data units which have been divided by said data division means and constitutes said original image;

data storage means for rearranging the data units compressed in units of scan lines by said compression means such that data units belonging to the same resolution component are put together, and hierarchically storing the respective resolution component data units in a storage area of said storage medium;

data management means for managing storage positions of the respective resolution component data units in said storage medium;

data read means for reading out, on the basis of management data held by said data management means, only resolution component data units in accordance with a request from a user, selected out of all resolution component data units constituting said original image, stored in said storage medium in correspondence with a request from a user; and image display means for displaying an image on the basis of the data read out by said data read means.

33. An image data writing/reading system comprising:

data division means for dividing data on all scan lines constituting an input original image into a plurality of groups such that each of said groups contains data on scan lines of an equal interval, different groups corresponding to different intervals, and the group of the wider interval is considered to correspond to the lower resolution component data unit while the group of the narrower interval is considered to correspond to the higher resolution component data unit;

data storage means for rearranging the plurality of resolution component data units divided by said data division means such that data units belonging to the same resolution component are put together, and hierarchically storing the respective resolution component data units in a storage area of said storage medium;

data management means for managing storage positions of the respective resolution component data units in said storage medium;

data read means for reading out, on the basis of management data held by said data management means, only data units on scan lines corresponding to a partial region designated by a user, selected out of all resolution component data units constituting said original image, stored in said storage medium;

data extraction means for extracting data in said partial region designated by said user from the data read out by said data read means; and image display means for displaying an image on the basis of said data extracted by said data extraction means.

34. A data reading method comprising steps of:

dividing the data on all scan lines constituting an original image into a plurality of groups such that each of said groups contains data on scan lines of an equal interval, different groups correspond to different intervals, and the group of the wider interval is considered to correspond to the lower resolution component data unit while the group of the narrower interval is considered to correspond to the higher resolution component data unit, rearranging the plurality of resolution component data units such that data units belonging to the same resolution component are put together, and storing said original image in a storage medium such that the lower resolution component data unit is stored in the upper layer of the storage area of said storage medium while the higher resolution component data unit is stored in the lower layer of said storage area of said storage medium, and developing in advance, when a request for reading out data of a low resolution component data unit is issued to said storage medium, a higher resolution component data unit associated as data which is likely to be read out next to the requested low resolution component data unit in accordance with a predetermined rule, from a low-speed storage unit to a high-speed storage unit.

35. A method according to claim 34, further comprising a step of, when the data is read out from said low-speed storage unit, copying the readout data into said high-speed storage unit.

36. A method according to claim 34 while causing an operating system applied to a computer to interpret the predetermined rule.

37. A method according to claim 36, further comprising steps of determining a file name of data to be developed in advance on the basis of a file name of data which is read-requested from said operating system, and supplying the determined file name to a file system of said operating system.

38. A method according to claim 36, wherein the predetermined rule includes at least one of a rule for associating different data files with each other and a rule for associating parts of the same data file with each other.

39. A data reading method comprising steps of:

dividing data on all scan lines constituting an original image into a plurality of groups such that each of said groups contains data on scan lines of an equal interval, different groups correspond to different intervals, and the group of the wider interval is considered to correspond to the lower resolution component data unit while the group of the narrower interval is considered to correspond to the higher resolution component data unit, rearranging the plurality of resolution component data units such that data units belonging to the same resolution component are put together, and storing said original image in a storage medium such that the lower resolution component data unit is stored in the upper layer of the storage area of said storage medium while the higher resolution component data unit is stored in the lower layer of said storage area of said storage medium, and determining whether a low resolution component data unit is stored in a high-speed storage unit when a request for reading out said low resolution component data unit is issued to said storage medium, reading out the data unit from said high-speed storage unit when the requested data unit is stored in said high-speed storage unit, reading out the data unit from a low-speed storage unit when the requested data unit is not stored in said high-speed storage unit, and developing in advance a higher resolution component data unit associated as a data unit which is likely to be read out next to the requested low resolution component data unit in accordance with a predetermined rule, from said low-speed storage unit to said high-speed storage unit.

40. A data reading apparatus comprising:

data storage means for dividing the data on all scan lines constituting an original image into a plurality of groups such that each of said groups contains data on scan lines of an equal interval, different groups correspond to different intervals, and the group of the wider interval is considered to correspond to the lower resolution component data unit while the group of the narrower interval is considered to correspond to the higher resolution component data unit, rearranging the plurality of resolution component data units such that data units belonging to the same resolution component are put together, and storing said original image such that the lower resolution component data unit in the upper layer of its storage area while the higher resolution component data unit in the lower layer of its storage area, rule storage means for storing a rule defining a predetermined read rule; and read control means for, when a request for reading out a low resolution component data unit is issued to said storage means, developing in advance a higher resolution component data unit associated as data unit which is likely to be read out next to the requested low resolution component data unit on the basis of the rule stored in said rule storage means, from a low-speed storage unit to a high-speed storage unit.

41. An apparatus according to claim 40, wherein the rule stored in said rule storage means is a rule defining to cause an operating system applied to a computer to perform processing of developing data in advance from said low-speed storage unit to said high-speed storage unit.

42. An apparatus according to claim 40, wherein said low-speed storage unit is a disk library unit having a plurality of disks for storing data.

43. A data reading apparatus comprising:

data storage means for dividing the data on all scan lines constituting an original image into a plurality of groups such that each of said groups contains data on scan lines of an equal interval, different groups correspond to different intervals, and the group of the wider interval is considered to correspond to the lower resolution component data unit while the group of the narrower interval is considered to correspond to the higher resolution component data unit, rearranging the plurality of resolution component data units such that data units belonging to the same resolution component are put together, and storing said original image such that the lower resolution component data unit in the upper layer of its storage area while the higher resolution component data unit in the lower layer of its storage area, rule storage means for storing a rule defining a predetermined read rule; and read control means for determining whether a low resolution component data unit is stored in a high-speed storage unit when a request for reading out said low resolution component data unit is issued to said storage means, reading out the data from said high-speed storage unit when the requested data unit is stored in said high-speed storage unit, reading out the data from a low-speed storage unit when the requested data unit is not stored in said high-speed storage unit, and developing in advance a higher resolution component data unit, associated as a data unit which is likely to be read out next to the requested low resolution component data unit on the basis of the rule stored in said rule storage means, from said low-speed storage unit to said high-speed storage unit.

* * * * *

UNITED STATES PATENT AND TRADEMARK OFFICE
CERTIFICATE OF CORRECTION

PATENT NO.      : 6,396,507 B1
DATED           : May 28, 2002
INVENTOR(S)     : Hiroshi Kaizuka, and Katsuhiro Aoyagi, both of Tokyo (JP)

It is certified that error appears in the above-identified patent and that said Letters Patent is hereby corrected as shown below:

<u>Title page,</u>
Item [73], change Assignee "Nippon Steel Corporation, Tokyo (JP)" to
-- NS Solutions Corporation, Tokyo (JP) --

Signed and Sealed this

Ninth Day of July, 2002

*Attest:*

*Attesting Officer*

JAMES E. ROGAN
*Director of the United States Patent and Trademark Office*